United States Patent
Oh et al.

(10) Patent No.: US 9,846,337 B2
(45) Date of Patent: Dec. 19, 2017

(54) LIQUID CRYSTAL DISPLAY

(71) Applicant: Samsung Display Co. Ltd., Yongin (KR)

(72) Inventors: Ik Han Oh, Cheonan-si (KR); Seong Young Lee, Hwaseong-si (KR); Se Hyun Lee, Seoul (KR); Hyung Jun Park, Seongnam-si (KR); Youn Hak Jeong, Cheonan-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 43 days.

(21) Appl. No.: 14/991,769

(22) Filed: Jan. 8, 2016

(65) Prior Publication Data

US 2016/0377933 A1    Dec. 29, 2016

(30) Foreign Application Priority Data

Jun. 24, 2015  (KR) .................. 10-2015-0089939

(51) Int. Cl.
| | |
|---|---|
| *G02F 1/1337* | (2006.01) |
| *G02F 1/1343* | (2006.01) |
| *G02F 1/1335* | (2006.01) |

(52) U.S. Cl.
CPC .. *G02F 1/134309* (2013.01); *G02F 1/133528* (2013.01); *G02F 1/133707* (2013.01); *G02F 1/133753* (2013.01)

(58) Field of Classification Search
CPC ......... G02F 1/133707; G02F 1/134309; G02F 1/133753; G02F 2001/133757
See application file for complete search history.

(56) References Cited

U.S. PATENT DOCUMENTS

| | | | |
|---|---|---|---|
| 2010/0157232 A1 | 6/2010 | Kim et al. | |
| 2013/0242239 A1* | 9/2013 | Chang ............... | G02F 1/133707 349/106 |
| 2014/0092353 A1 | 4/2014 | Matsushima | |
| 2014/0152934 A1 | 6/2014 | Huh et al. | |
| 2014/0168582 A1* | 6/2014 | Chang ............... | G02F 1/134309 349/106 |

(Continued)

FOREIGN PATENT DOCUMENTS

| | | |
|---|---|---|
| JP | 2009086629 | 4/2009 |
| KR | 1020010003751 | 1/2001 |

(Continued)

*Primary Examiner* — Jia Pan
(74) *Attorney, Agent, or Firm* — Cantor Colburn LLP

(57) ABSTRACT

A liquid crystal display includes a first panel including a first electrode which includes a central electrode disposed in a central region of a pixel, a micro-branch part extending in a direction from at least one side of the central electrode, a peripheral electrode connected to an end of part of the micro-branch part, and a corner pattern provided in a corner region of the pixel, a second panel including horizontal and vertical incision parts which divide the micro-branch part, the central electrode and the peripheral electrode of the first electrode into a plurality of domains and a second electrode which is divided corresponding to plurality of domain regions, and where in the first panel, the peripheral electrode adjacent to the corner pattern is disposed on at least one of an edge region of the pixel in a direction parallel to the horizontal or vertical incision part.

19 Claims, 13 Drawing Sheets

(56) References Cited

U.S. PATENT DOCUMENTS

| | | | |
|---|---|---|---|
| 2014/0267994 A1* | 9/2014 | Ryu | G02F 1/133707 349/141 |
| 2016/0195781 A1 | 7/2016 | Lee et al. | |
| 2016/0246089 A1 | 8/2016 | Jeong et al. | |

FOREIGN PATENT DOCUMENTS

| | | |
|---|---|---|
| KR | 1020060071677 | 6/2006 |
| KR | 1020080025341 | 3/2008 |
| KR | 1020080028565 | 4/2008 |
| KR | 1020110111227 | 10/2011 |
| KR | 1020130104224 | 9/2013 |
| KR | 1020130104521 | 9/2013 |
| KR | 1020140113035 | 9/2014 |
| KR | 1020150019131 | 2/2015 |
| KR | 1020160084555 | 7/2016 |
| KR | 1020160103243 | 9/2016 |

\* cited by examiner

LIQUID CRYSTAL DISPLAY

This application claims priority to Korean Patent Application No. 10-2015-0089939 filed on Jun. 24, 2015, and all the benefits accruing therefrom under 35 U.S.C. §119, the content of which in its entirety is herein incorporated by reference.

BACKGROUND

1. Field

The exemplary embodiment relate to a liquid crystal display ("LCD").

2. Description of the Related Art

Liquid crystal displays ("LCDs") are one of the most widely used types of flat panel displays. Generally, an LCD generally includes a pair of display panels having electric field generating electrodes, such as pixel electrodes and a common electrode, and a liquid crystal layer interposed between the display panels. In an LCD, voltages are applied to electric field generating electrodes to generate an electric field in a liquid crystal layer. Accordingly, the alignment of liquid crystal molecules of the liquid crystal layer is determined, and polarization of incident light is controlled. As a result, a desired image is displayed on the LCD.

Among various types of LCDs, vertically aligned ("VA") mode LCDs, in which long axes of liquid crystal molecules are aligned perpendicular to upper and lower display panels when no electric field is applied, are popular due to their high contrast ratios and wide standard viewing angles.

To make VA mode LCDs have wide viewing angles, a plurality of domains having different alignment directions of liquid crystals may be provided in one pixel.

One exemplary method of defining a plurality of domains is to define an incision part, such as a slit, in an electric field generating electrode. In this method, liquid crystals are rearranged by a fringe field generated between an edge of the incision part and the electric field generating electrode which faces the incision part, thereby defining a plurality of domains.

In VA mode LCDs, securing a wide viewing angle is an important challenge. To this end, an incision part such as a micro-slit may be defined in an electric field generating electrode, or a protrusion may be provided on the electric field generating electrode. The incision part and the protrusion determine a tilt direction of liquid crystal molecules. Therefore, the tilt direction of the liquid crystal molecules may be diversified to various directions by appropriately placing the incision part and the protrusion, thereby widening the viewing angle of a VA mode LCD.

In addition, VA mode LCDs may have poor lateral visibility compared with front visibility. To solve this problem, one pixel electrode may be split into two subpixel electrodes, and high and low voltages may be applied to the two subpixel electrodes, respectively. Accordingly, liquid crystal molecules of the two subpixel electrodes may be aligned in different directions, thereby improving visibility in left and right viewing angle directions.

SUMMARY

Exemplary embodiments of the invention provide a liquid crystal display ("LCD") having improved transmittance and with the same response time.

However, exemplary embodiments of the invention are not restricted to the ones set forth herein. The above and other exemplary embodiments of the invention will become more apparent to one of ordinary skill in the art to which the invention pertains by referencing the detailed description of the invention given below.

According to an exemplary embodiment of the invention, a liquid crystal display ("LCD") comprising a first panel comprising a first electrode which comprises a central electrode disposed in a central region of a pixel, a micro-branch part extending in a direction from at least one side of the central electrode, a peripheral electrode connected to an end of part of the micro-branch part, and a corner pattern provided in a corner region of the pixel by removing an end of the micro-branch part; a second panel comprising horizontal and vertical incision parts which divide the micro-branch part, the central electrode and the peripheral electrode of the first electrode into a plurality of domains and a second electrode which is divided by the horizontal and vertical incision parts into a plurality of domain regions respectively corresponding to the domains; and a liquid crystal layer disposed between the first panel and the second panel and having liquid crystals wherein in the first panel, the peripheral electrode located adjacent to the corner pattern is disposed on at least any one of an edge region of the pixel in a direction parallel to the horizontal or vertical incision part.

In an exemplary embodiment, the first panel further may comprise first slit patterns which separate some of a plurality of branch electrodes of the micro-branch part; and second slit patterns which separate some of the branch electrodes of the micro-branch part, wherein ends of the first slit patterns disposed along a lengthwise direction of the branch electrodes contact the central electrode, and the other ends of the first slit patterns contact the peripheral electrode, and ends of the second slit patterns disposed along the lengthwise direction of the branch electrodes contact the central electrode, and the other ends of the second slit patterns are connected to the corner pattern.

In an exemplary embodiment, the micro-branch part of the first panel may be disposed in each of the domains, the micro-branch part comprises the branch electrodes, and the first and second slit patterns are defined by removing spaces between neighboring branch electrodes and separating the branch electrodes from each other.

In an exemplary embodiment, the first panel further may comprise third slit patterns which separate some of the branch electrodes of the micro-branch part, wherein ends of the third slit patterns disposed along the lengthwise direction of the branch electrodes contact the central electrode, and the other ends of the third slit patterns extend up to the edge region of the pixel.

In an exemplary embodiment, the first and third slit patterns of the first panel may be alternately arranged.

In an exemplary embodiment, the branch electrodes and the first slit patterns in each domain may be alternately arranged with those in an adjacent domain.

In an exemplary embodiment, the area of the corner pattern in the corner region of the pixel may be asymmetrical to that of the corner pattern in another corner region of the pixel.

In an exemplary embodiment, the peripheral electrode may be disposed on at least any one of left, right, upper and lower sides of the edge region of the pixel and in any least one of the domains.

In an exemplary embodiment, the central electrode has any one of a polygonal shape may select from the group consisting of stems intersecting each other, a diamond, a quadrilateral and an octagon, a circular shape and a combination of the polygonal and circular shapes.

In an exemplary embodiment, the micro-branch part extending from any one side of the central electrode to the corner region of the pixel may have a length of approximately 30 micrometers (μm) or less.

In an exemplary embodiment, the second electrode may comprise the horizontal incision part which divides the central electrode into upper and lower domains and the vertical incision part which intersects the horizontal incision part and divides the central electrode into left and right domains, wherein an opening part is disposed at an intersection of the horizontal incision part and the vertical incision part.

In an exemplary embodiment, the opening part may have a width of approximately 2 (μm) to approximately 12 μm.

In an exemplary embodiment, the first electrode further comprises a connection electrode which may be disposed between the central electrode and the peripheral electrode and in a region corresponding to each of the horizontal and vertical incision parts.

In an exemplary embodiment, the first electrode disposed in the pixel may comprise a first region in which the micro-branch part located adjacent to the central electrode is disposed; and a second region which is separated from the central electrode and in which at least one peripheral electrode is disposed at an end of at least one branch electrode of the micro-branch part, wherein the peripheral electrode disposed in the second region provides a vector that rotates liquid crystal molecules located in the second region in a direction similar to an average azimuthal angle of liquid crystal molecules located in the first region.

In an exemplary embodiment, a direction in which the branch electrodes extend may be the same as the average azimuthal angle.

In an exemplary embodiment, further comprising first and second polarizing plates which may be respectively disposed on the first and second panels and have polarization axes orthogonal to each other, wherein the direction in which the branch electrodes extend is at an angle of approximately 30 degrees to approximately 60 degrees with respect to the polarization axes of the first and second polarizing plates.

In an exemplary embodiment, the peripheral electrode may have a width of approximately 1 μm to approximately 5 μm.

In an exemplary embodiment, the branch electrodes and the first through third slit patterns may be arranged at a pitch of approximately 4 μm to approximately 8 μm.

In an exemplary embodiment, the second slit patterns in each pixel may be alternately arranged with those in another pixel.

In an exemplary embodiment, the branch electrodes and the first slit patterns may have equal widths.

Other features and exemplary embodiments will be apparent from the following detailed description, the drawings, and the claims.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
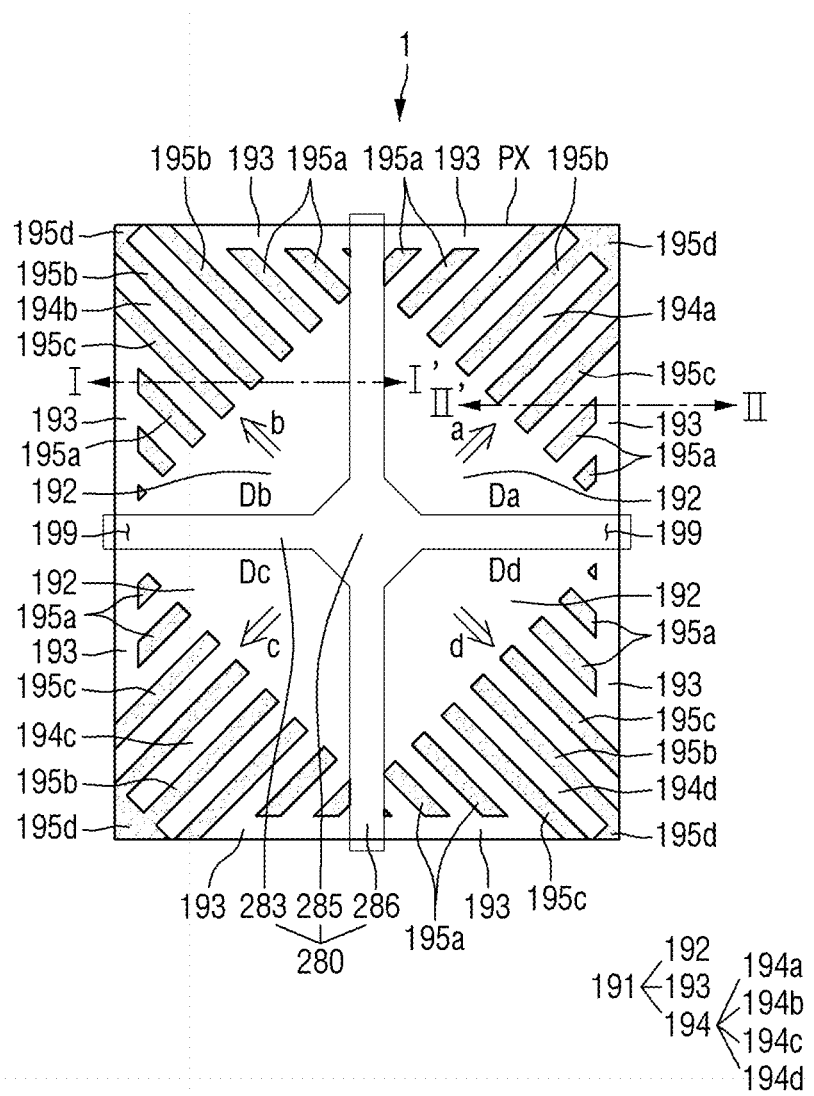
FIG. 1 is a schematic plan view of an exemplary embodiment of a pixel of a liquid crystal display ("LCD") according to the invention.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," may therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Embodiments of the invention will now be explained with reference to the drawings.

Figure 2:
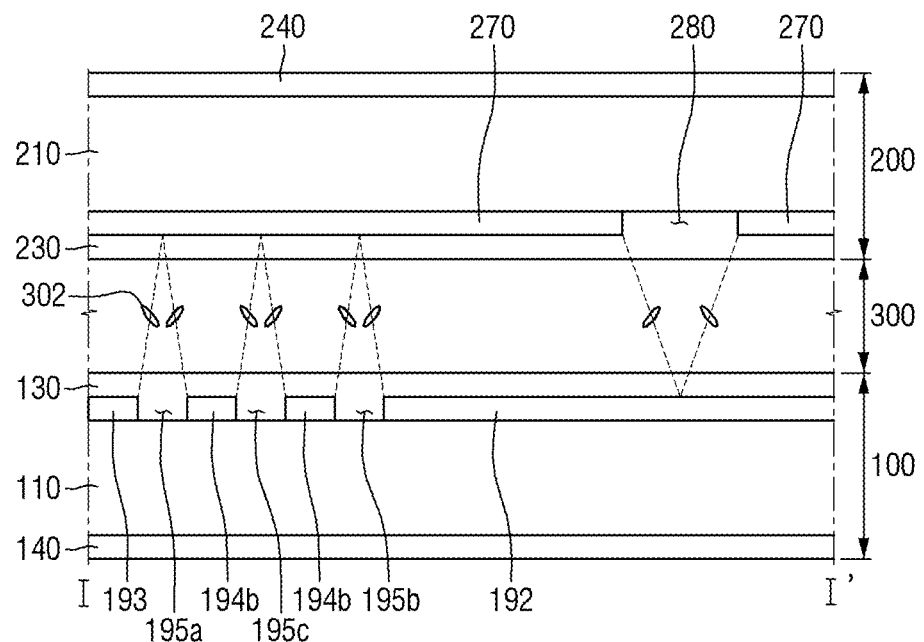
FIG. 2 is a schematic cross-sectional view of the LCD, taken along line I-I' of FIG. 1.
Figure 3:
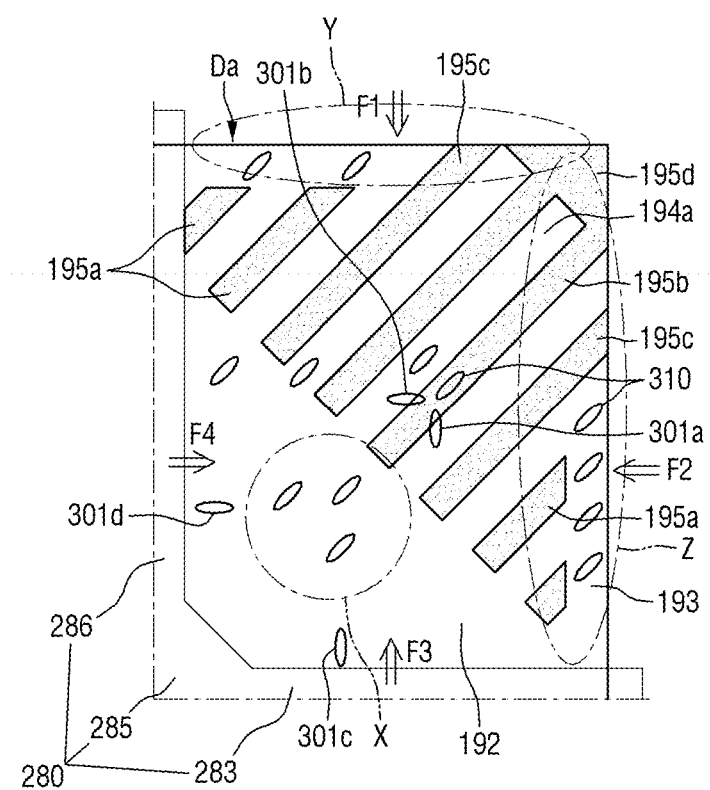
FIG. 3 is an enlarged plan view of an exemplary embodiment of one domain according to the invention.
Figure 4:
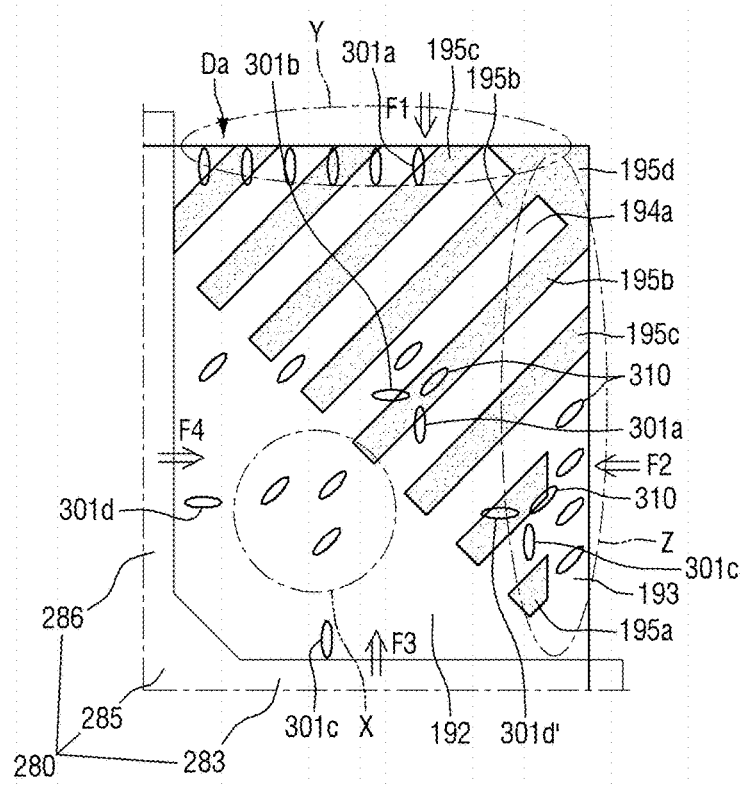
FIG. 4 is an enlarged plan view of another exemplary embodiment of one domain according to the invention.
Figure 5:
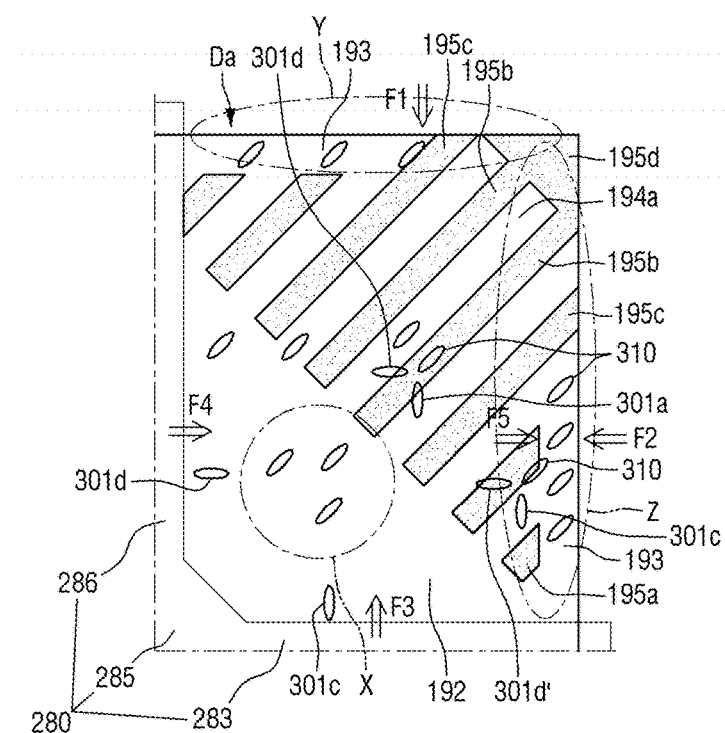
FIG. 5 is a schematic view illustrating the behavior of liquid crystals in the exemplary embodiment of FIG. 3.

FIG. 1 is a schematic plan view of a pixel of a liquid crystal display ("LCD") 1 according to an exemplary embodiment of the invention. FIG. 2 is a schematic cross-sectional view of the LCD 1, taken along line I-I' of FIG. 1. FIG. 3 is an enlarged plan view of one domain according to an exemplary embodiment of the invention. FIG. 4 is an enlarged plan view of one domain according to another exemplary embodiment of the invention. FIG. 5 is a schematic view illustrating the behavior of liquid crystals in the exemplary embodiment of FIG. 3.

In FIGS. 1 through 5, one pixel PX of the LCD 1 is illustrated as an example. However, the LCD 1 may include a plurality of pixels arranged in rows and columns.

Referring to FIGS. 1 and 2, the LCD 1 includes a first panel 100 and a second panel 200 which face each other and a liquid crystal layer 300 which is located between the first panel 100 and the second panel 200.

The first panel 100 may include a first substrate 110, a first electrode and a first alignment layer 130 which are located sequentially on a surface of the first substrate 110, and a first polarizing plate 140 which is located on the other surface of the first substrate 110. The first electrode disposed on the first panel 100 may be, for example, a pixel electrode 191.

The second panel 200 may include a second substrate 210, a second electrode and a second alignment layer 230 which are located sequentially on a surface of the second substrate 210, and a second polarizing plate 240 which is located on the other surface of the second substrate 210. The second electrode disposed on the second panel 200 may be, for example, a common electrode 270.

In an exemplary embodiment, the pixel PX may be roughly rectangular, for example. The pixel electrode 191 may correspond to and cover the pixel PX, and the common electrode 270 may be disposed as a single piece on the whole of the second panel 200. Incision part 280 may be defined in a portion of the common electrode 270, but the invention is not limited thereto.

The first panel 100 or the second panel 200 may further include a switching device (not illustrated), a color filter (not illustrated), and a light-blocking member (not illustrated). In an exemplary embodiment, one of the first polarizing plate 140 and the second polarizing plate 240 may be omitted. In some exemplary embodiments, at least one of the first and second alignment layers 130 and 230 may be omitted.

The liquid crystal layer 300 may include liquid crystals having negative dielectric anisotropy or positive dielectric anisotropy. In the following exemplary embodiments, a case where the liquid crystal layer 300 includes liquid crystals having negative dielectric anisotropy will be described as an example. When an electric field is not generated between the pixel electrode 191 and the common electrode 270, long axes of liquid crystal molecules 302 of the liquid crystal layer 300 may be arranged roughly perpendicular to surfaces of the first and second alignment layers 130 and 230. In an alternative exemplary embodiment, the long axes of the liquid crystal molecules 302 may be arranged at a pretilt angle with respect to a thickness direction of the liquid crystal layer 300.

When an electric field is generated in the liquid crystal layer 300 by applying a potential difference between the pixel electrode 191 and the common electrode 270, the long axes of the liquid crystal molecules 302 may be arranged perpendicular to the electric field. The degree to which the liquid crystal molecules 302 tilt may determine the degree of change in polarization of light incident upon the liquid crystal layer 300. The change in polarization may be converted into a change in transmittance by the first and second polarizing plates 140 and 240. Accordingly, an image may be displayed on the LCD 1.

To improve a viewing angle of the LCD 1 that displays an image, a plurality of domains may be provided by patterning the pixel electrode 191 and the common electrode 270.

Specifically, a plurality of first through third slit patterns 195a through 195c may be defined in the pixel electrode 191, and the incision part 280 may be defined in the common electrode 270 which faces the pixel electrode 191. The first through third slit patterns 195a through 195c and the incision part 280 may control the direction of an electric field. By patterning the pixel electrode 191 and the common electrode 270 as described above, one pixel PX may be split into a plurality of domains in which the liquid crystal molecules 302 having different average azimuthal angles are arranged in different directions.

The pixel PX may include four domains, that is, first through fourth domains Da through Dd divided by a horizontal incision part 283 and a vertical incision part 286 of the common electrode 270. In an exemplary embodiment, the incision part 280 may have a width of about 2 micrometers (μm) to about 5 μm, for example. In some exemplary embodiments, the width of the incision part 280 may be adjusted in order to improve the control over liquid crystals.

In an exemplary embodiment, the incision part 280 having a width of approximately about 2 μm to about 5 μm may improve visibility without reducing transmittance of the pixel PX, for example. In an exemplary embodiment, the incision part 280 having a width of approximately 5 μm or less may prevent a fringe field from increasing excessively at a boundary between the first and fourth domains Da and Dd and the second and third domains Db and Dc, thereby minimizing a reduction in visibility and transmittance, for example. In an exemplary embodiment, the incision part 280 having a width of approximately 5 μm or less may prevent the liquid crystal molecules 302 from lying in a region in which the incision part 280 is disposed, for example. Therefore, a reduction in aperture ratio may be reduced.

An opening part 285 may be disposed at an intersection of the horizontal incision part 283 and the vertical incision part 286. The opening part 285 may be wider than the horizontal and vertical incision parts 283 and 286. In an exemplary embodiment, the opening part 285 may have a width of 2 μm to approximately 12 μm, for example.

The pixel electrode 191 may be split into the first through fourth domains Da through Dd by the horizontal and vertical incision parts 283 and 286 of the common electrode 270.

The pixel electrode 191 may include a peripheral electrode 193 which is disposed in an edge region of the pixel PX in each of the first through fourth domains Da through Dd, a central electrode 192 which is connected to the peripheral electrode 193 and disposed in a central region of the pixel PX, and a micro-branch part 194 which extends in a direction from at least one side of the central electrode 192, and a part of which is connected to the peripheral electrode 193. The micro-branch part 194 may include a plurality of branch electrodes 194a through 194d disposed in the first through fourth domains Da through Dd, respectively.

In each corner region of the pixel PX, a corner pattern 195d may be disposed. The corner pattern 195d may be defined by removing an end of the micro-branch part 194. The corner pattern 195d may be defined by partially removing each corner region of the branch electrodes 194a, 194b, 194c or 194d to expose, for example, an insulating layer disposed under the pixel electrode 191.

The peripheral electrode 193 may be disposed adjacent to the corner pattern 195d and on at least any one side of the edge region of the pixel PX. The peripheral electrode 193 may be disposed parallel to the horizontal or vertical incision part 283 or 286.

In each of the first through fourth domains Da through Dd of the pixel PX, the first through third slit patterns 195a through 195c may be defined in the branch electrodes 194a, 194b, 194c or 194d. The first through third slit patterns 195a through 195c may expose an insulating layer by removing spaces between neighboring electrodes and separating the branch electrodes 194a, 194b, 194c or 194d from each other.

In each of the first through fourth domains Da through Dd, the first slit patterns 195a may separate some of the branch electrodes 194a, 194b, 194c or 194d of the micro-branch part 194. Ends of the first slit patterns 195a disposed along a lengthwise direction of the branch electrodes 194a, 194b, 194c or 194d may contact the central electrode 192, and the other ends thereof may contact the peripheral electrode 193.

The second slit patterns 195b may separate some of the branch electrodes 194a, 194b, 194c or 194d of the micro-branch part 194. Ends of the second slit patterns 195b disposed along the lengthwise direction of the branch electrodes 194a, 194b, 194c or 194d may contact the central electrode 192, and the other ends thereof may contact the corner pattern 195d.

The third slit patterns 195c may separate some of the branch electrodes 194a, 194b, 194c or 194d of the micro-branch part 194. Ends of the third slit patterns 195c disposed along the lengthwise direction of the branch electrodes 194a, 194b, 194c or 194d may contact the central electrode 192, and the other ends thereof may extend up to the edge region of the pixel PX.

In each of the first through fourth domains Da through Dd, the peripheral electrode 193 and any one of the branch electrodes 194a, 194b, 194c or 194d of the micro-branch part 194 may be connected to each other, and a connection electrode 199 may be disposed at a boundary between the peripheral electrode 193 and the central electrode 192 to overlap each of the horizontal and vertical incision parts 283 and 286. Therefore, the central electrode 192, the micro-branch part 194 and the peripheral electrode 193 of the pixel electrode 191 maybe connected to each other.

Since the central electrode 192, the micro-branch part 194 and the peripheral electrode 193 of the pixel electrode 191 disposed in one pixel PX are provided as a single piece, the same voltage may be applied to the central electrode 192, the micro-branch part 194 and the peripheral electrode 193. In addition, the pixel electrode 191 may be divided into the first through fourth domains Da through Dd by the horizontal and vertical incision parts 283 and 286.

In an exemplary embodiment, the central electrode 192 may be diamond-shaped as in the illustrated exemplary embodiment, for example. However, the shape of the central electrode 192 is not limited to the diamond shape, and the central electrode 192 may also have the same stem shape as the horizontal and vertical incision parts 283 and 286. In addition, the area of the central electrode 192 may be adjusted to a size different from the one illustrated in FIG. 1.

The area of the central electrode 192 and the area of the opening part 285 corresponding to the central electrode 192 may be adjusted to control the response speed of liquid crystals. In other words, since the area of the pixel electrode 191 is increased by the peripheral electrode 193 in the illustrated exemplary embodiment, the response speed may be reduced. However, when the intensity of an electric field generated in the pixel PX is controlled by adjusting the area of the opening part 285 and the area of the central electrode 192, the response speed of the liquid crystals may be improved.

The micro-branch part 194 extending from each side of the central electrode 192 may be disposed in the pixel PX. The micro-branch part 194 may include the first through fourth branch electrodes 194a through 194d disposed in the first through fourth domains Da through Dd, respectively. Hereinafter, the first through fourth branch electrodes 194a through 194d will be collectively referred as the branch electrodes 194a through 194d for convenience.

The first branch electrodes 194a of the micro-branch part 194 may be disposed in the first domain Da and extend obliquely in an upper right direction from the horizontal incision part 283 or the vertical incision part 286. The second branch electrodes 194b of the micro-branch part 194 may be disposed in the second domain Db and extend obliquely in an upper left direction from the horizontal incision part 283 or the vertical incision part 286. The third branch electrodes 194c of the micro-branch part 194 may be disposed in the third domain Dc and extend obliquely in a lower left direction from the horizontal incision part 283 or the vertical incision part 286. The fourth branch electrodes 194d of the micro-branch part 194 may be disposed in the fourth domain Dd and extend obliquely in a lower right direction from the horizontal incision part 283 or the vertical incision part 286.

The first and second branch electrodes 194a and 194b may be disposed at an angle of approximately 45 degrees or approximately 135 degrees with reference to the horizontal incision part 283. In addition, the third and fourth branch electrodes 194c and 194d may be disposed at an angle of approximately 225 degrees or approximately 315 degrees with reference to the horizontal incision part 283. Branch electrodes of two neighboring domains may be disposed orthogonal to each other.

In other words, the branch electrodes 194a through 194d, for example, the first branch electrodes 194a in the first domain Da may extend in a direction that is at an angle of approximately 30 degrees to approximately 60 degrees with reference to a polarization axis of a polarizing plate.

When the micro-branch part 194 extends from any one side of the central electrode 192 as described above, the control over liquid crystals may be improved, texture may be reduced, and transmittance and response speed may be improved. In particular, when a region of the micro-branch part 194 which corresponds to the periphery of each sub-pixel electrode 191H or 191L (refer to FIG. 23) in an LCD 1 which will be described later and a region of the micro-branch part 194 which does not correspond to the peripheral of each of the subpixel electrodes 191H and 191L are enlarged asymmetrically, that is, when ends of the branch electrodes 194a through 194d are placed to correspond to the first through third slit patterns 195a through 195c of an adjacent pixel PX, performance such as the control over liquid crystals may be effectively improved.

Therefore, in each of the first through fourth domains Da through Dd, the branch electrodes 194a, 194b, 194c or 194d may be separated by the first slit patterns 195a in a region in which the peripheral electrode 193 is connected to the branch electrodes 194a, 194b, 194c or 194d, and the first slit patterns 195a and the branch electrodes 194a, 194b, 194c or 194d may be placed in a direction diagonal to the horizontal and vertical incision parts 283 and 286. Accordingly, the liquid crystal molecules 302 may be arranged at an average azimuthal angle 310 at which maximum transmittance may be obtained.

In addition, the second slit patterns 195b may be connected to part of the corner pattern 195d, and the peripheral electrode 193 and the corner pattern 195d may be separated from each other by partially removing ends of the branch electrodes 194a, 194b, 194c or 194d located adjacent to the peripheral electrode 193. At least one peripheral electrode 193 may be disposed in at least one of the first through fourth domains Da through Dd. In the illustrated exemplary embodiment, the peripheral electrode 193 is disposed parallel to each of the horizontal and vertical incision parts 283 and 286 in each of the first through fourth domains Da through Dd. However, the invention is not limited thereto.

The peripheral electrode 193 disposed in at least any one of the first through fourth domains Da through Dd may be connected to another peripheral electrode 193 disposed in another domain by the connection electrode 199. That is, one peripheral electrode may be disposed in two domains. However, the invention is not limited thereto, and the connection electrode 199 may play the role of the peripheral electrode 193.

In each of the first through fourth domains Da through Dd of the illustrated exemplary embodiment, the peripheral electrode 193 is shaped like a bar that is disposed adjacent to the corner pattern 195d and extends parallel to each of the horizontal and vertical incision parts 283 and 286. Therefore, the connection electrode 199 of the pixel PX connects the branch electrodes 194a, 194b, 194c or 194d to the peripheral electrode 193. Accordingly, the peripheral electrode 193 may be disposed in a region excluding the corner region of the pixel PX.

In some cases, in each of the first through fourth domains Da through Dd, the central electrode 192 may be connected to the branch electrodes 194a, 194b, 194c or 194d, and the branch electrodes 194a, 194b, 194c or 194d and the central electrode 192 may be connected to the peripheral electrode 193 by the connection electrode 199. Therefore, the peripheral electrode 193 may extend up to the corner region of the pixel PX. However, since the corner region of the pixel PX is located far away from the opening part 285, the control over liquid crystals may be low in the corner region of the pixel PX. Therefore, for such reasons as transmittance, the corner pattern 195d may be defined in the corner region of the pixel electrode 191 by partially removing the corner region.

In an exemplary embodiment, the first through third slit patterns 195a through 195c and the branch electrodes 194a through 194d may have equal widths. In an exemplary embodiment, the peripheral electrode 193 and the branch electrodes 194a through 194d may have equal widths. In the exemplary embodiment, the peripheral electrode 193 may have a width of approximately 1 µm to approximately 5 µm, for example. Specifically, the peripheral electrode 193 may have a width of approximately 2 µm to approximately 4 µm, for example.

Therefore, the force of an electric field between the branch electrodes 194a, 194b, 194c or 194d may be similar to that of an electric field between the peripheral electrode 193 and the branch electrodes 194a, 194b, 194c or 194d, thus preventing the liquid crystal molecules 302 from pretilting in any one direction.

In an exemplary embodiment, the branch electrodes 194a through 194d and the first slit patterns 195a may be arranged at a pitch of approximately 4 µm to approximately 8 µm, for example. More specifically, the branch electrodes 194a through 194d and the first slit patterns 195a may be arranged at a pitch of approximately 5 µm to approximately 7 µm, for example.

In each of the first through fourth domains Da through Dd, lengths of the branch electrodes 194a, 194b, 194c or 194d extending from any one side of the central electrode 192 to the corner region of the pixel PX may be equal to a liquid crystal controllable distance of approximately 25 µm to approximately 30 µm. Specifically, a distance from any one side of the central electrode 192 to the corner pattern 195d that contacts the ends of the branch electrodes 194a, 194b, 194c or 194d may be in a range of approximately 26 µm to approximately 28 µm.

Assuming that an arrangement direction obtained by taking the average of arrangement directions of the liquid crystal molecules 302 in each of the first through fourth domains Da through Dd is the average azimuthal angle 310, the average azimuthal angle 310 may be a direction indicated by the sum of a vector created by an electric field in each of the first through fourth domains Da through Dd and a vector created by the collision of liquid crystals. That is, in each of the first through fourth domains Da through Dd, the liquid crystal molecules 302 may define an azimuthal angle similar to a direction in which the branch electrodes 194a, 194b, 194c or 194d extend. In each of the first through fourth domains Da through Dd, the liquid crystal molecules 302, when seen from above, may be aligned at the average azimuthal angle 310 corresponding to a direction indicated by an arrow a, b, c or d.

Specifically, the liquid crystal molecules 302 may be arranged in directions substantially parallel to directions from four parts at which edges of the pixel electrode 191 extending in different directions meet each other toward a central part of the cross-shaped incision part 280 of the common electrode 270. Therefore, directors of the liquid crystal molecules 302 in each of the first through fourth domains Da through Dd may be arranged by an electric field in a direction similar to the direction in which the branch electrodes 194a, 194b, 194c or 194d extend, and the liquid crystal molecules 302 may tilt in a total of four directions in each region of the electric field generating electrode.

As described above, the average azimuthal angle 310 of the liquid crystal molecules 302 may be determined to be the direction similar to the direction in which the branch electrodes 194a, 194b, 194c or 194d extend in each of the first through fourth domains Da through Dd.

Therefore, since the branch electrodes 194a through 194d of one pixel PX extend in four directions in the illustrated exemplary embodiment, the liquid crystal molecules 310 may also tilt in four directions. When the liquid crystal molecules 310 may be tilted in various directions as described above, the standard viewing angle of the LCD 1 may be increased.

In the exemplary embodiment of FIG. 3, the peripheral electrode 193 is disposed on both lateral sides and upper and lower sides of the pixel PX. In the exemplary embodiment of FIG. 4, the peripheral electrode 193 is disposed only on both lateral sides of the pixel PX.

In FIG. 5, the edge region of the pixel PX is illustrated to describe the behavior of liquid crystals.

In the LCD 1 according to the invention, a voltage is applied to between the pixel electrode 191 and the common electrode 270. The applied voltage changes the behavior of the liquid crystal molecules 302, thereby changing a refractive index of liquid crystals. As a result, gray levels may be expressed.

The LCD 1 according to the illustrated exemplary embodiment has a high contrast ratio due to superior dark characteristics. Since the LCD 1 uses negative liquid crystals, transmittance of the liquid crystals according to the behavior of the liquid crystal molecules 302 may vary greatly according to a direction in which the LCD 1 is viewed. That is, since the transmittance of the LCD 1 varies according to the direction in which the LCD 1 is viewed, the viewing angle thereof may be undermined.

To improve the viewing angle of the LCD 1, a plurality of domains in which the liquid crystal molecules 302 are arranged in different directions may be provided by providing an electrode pattern on each of the first panel 100 and the second panel 200 as described above with reference to FIGS. 1 and 2. Here, the electrode pattern may be, for example, the pixel electrode 191 or the common electrode 270.

The domains, that is, the first through fourth domains Da through Dd may minimize a difference in refractive index of liquid crystals according to the direction of the viewing angle, thereby improving visibility. However, while the first through fourth domains Da through Dd may minimize the difference in refractive index of the liquid crystals according to the direction of the viewing angle, there still remains the problem of distortion of a gray curve on the sides of the pixel PX.

This is because the first through fourth domains Da through Dd reduce light efficiency on the sides of the pixel PX due to a disclination line. The disclination line is generated because some liquid crystal molecules 302 are arranged in a direction matching the polarization axes of the first and second polarizing plates 140 and 240 when a bright state and a dark state are implemented.

To improve the above problem, the distortion of the gray curve in a low gray level range (dark state) and a high gray level range (bright state) may be reduced by changing the electrode pattern 191 and 270 as described above with reference to FIGS. 1 and 2. In addition, the distortion of the gamma curve may be minimized by reducing the difference in transmittance between high gray levels and low gray levels, thereby improving visibility.

The behavior of the liquid crystal molecules 302 for minimizing the distortion of the gamma curve will now be described in detail. In FIGS. 3 through 5, one domain is illustrated to describe the behavior of liquid crystals.

The behavior of the liquid crystal molecules 302 in the pixel PX will now be described with reference to FIGS. 3 through 5. Referring to FIGS. 3 through 5, an electric field may be generated in the liquid crystal layer 300 (refer to FIG. 2) between the pixel electrode 191 and the common electrode 270 by applying a data voltage to the pixel electrode 191 and a common voltage to the common electrode 270.

In response to the electric field generated in the liquid crystal molecules 302 of the liquid crystal layer 300, fringe fields may be generated by the incision part 280 of the common electrode 270 and the pixel electrode 191. The fringe fields that move the liquid crystal molecules 302 may include a first horizontal electric field Fl which is a horizontal electric field component in a first direction, a second horizontal electric field F2 which is a horizontal electric field component in a second direction, a third horizontal electric field F3 which is a horizontal electric field component in a third direction, and a fourth horizontal electric field F4 which is a horizontal electric field component in a fourth direction.

Here, the first and second horizontal electric fields Fl and F2 may be generated in directions from two opposite sides (e.g., upper and right sides) of the pixel electrode 191 toward the inside of the pixel PX, and the third and fourth horizontal electric fields F3 and F4 may be generated in directions from the cross-shaped incision part 280 of the common electrode 270 toward the inside of the pixel PX. The first and second horizontal electric fields F1 and F2 may cause first and second directors 301a and 301b of the liquid crystal molecules 302 to tilt roughly parallel to the polarization axes of the first and second polarizing plates 140 and 240, and the third and fourth horizontal electric fields F3 and F4 may cause third and fourth directors 301c and 301d of the liquid crystal molecules 302 to tilt roughly parallel to the polarization axes of the first and second polarizing plates 140 and 240. That is, the liquid crystal molecules 302 may tilt in four directions in one domain of the pixel PX.

More specifically, the first and second directors 301a and 301b of the liquid crystal molecules 302 located adjacent to edges of the pixel electrode 191 in one pixel PX may be perpendicular to the edges of the pixel electrode 191, respectively. In addition, the third and fourth directors 301c and 301d of the liquid crystal molecules 302 located adjacent to the incision part 280 of the common electrode 270 in one pixel PX may be perpendicular to edges of the incision part 280 of the common electrode 270, respectively.

As described above, fringe fields generated by the edges of the pixel electrode 191 and the incision part 280 of the common electrode 270 may initially determine directions of the first through fourth directors 301a through 301d of the liquid crystal molecules 302. Accordingly, the liquid crystal molecules 302 may initially be arranged in directions of the first through fourth directors 301a through 301d which were determined by the fringe fields generated by the electrodes to be directions roughly parallel to the polarization axes of the first and second polarizing plates 140 and 240.

The liquid crystal molecules 302 arranged in the directions of the first through fourth directors 301a through 301d may meet each other within the pixel PX to be rearranged in a direction that minimizes the adjustment of the first through fourth directors 301a through 301d. The direction in which the first through fourth directors 301a through 301d are rearranged may be a direction corresponding to the sum of vectors indicating the directions of the first through fourth directors 301a through 301d.

Therefore, the direction corresponding to the sum of the vectors indicating the directions of the first through fourth directors 301a through 301d may be a direction similar to the direction in which the branch electrodes 194a, 194b, 194c or 194d extend in each of the first through fourth domains Da through Dd. In addition, the direction corresponding to the sum of the vectors may be the average azimuthal angle 310. That is, the liquid crystal molecules 302 may be arranged at a different average azimuthal angle 310 in each of the first through fourth domains Da through Dd of the pixel PX.

The first through fourth directors 301a through 301d may also be provided in the branch electrodes 194a, 194b, 94c or 194d disposed between the first through third slit patterns 195a through 195c.

Specifically, in each of the first through fourth domains Da through Dd, sides of the branch electrodes 194a, 194b, 194c or 194d may generate horizontal components perpendicular thereto by distorting an electric field, and the direction in which the liquid crystal molecules 302 tilt may be determined by fringe fields F1 to F4. Therefore, the liquid crystal molecules 302 initially tend to tilt in a direction perpendicular to the sides of the branch electrodes 194a, 194b, 194c or 194d.

Here, horizontal components of an electric field generated by sides of neighboring branch electrodes 194a, 194b, 194c or 194d have opposite directions, and a gap between the branch electrodes 194a, 194b, 194c or 194d is small. Therefore, the liquid crystal molecules 302 that tend to tilt in opposite directions may tilt in a direction parallel to the lengthwise direction of the branch electrodes 194a, 194b, 194c or 194d.

That is, the liquid crystal molecules 302 may be tilted in the direction parallel to the lengthwise direction of the branch electrodes 194a, 194b, 194c or 194d through two stages as in the illustrated exemplary embodiment. However, the liquid crystal molecules 302 may also be tilted in the direction parallel to the lengthwise direction of the branch electrodes 194a, 194b, 194c or 194d by providing, for example, protrusions on a substrate. In this case, the protrusions may cause the liquid crystal molecules 302 to pretilt in the direction parallel to the lengthwise direction of the branch electrodes 194a, 194b, 194c or 194d.

When the first through third slit patterns 195a through 195c are provided in the pixel PX as described above, the liquid crystal molecules 310 may be tilted by the effect of the fringe fields F1 to F4 in the directions of the first through fourth directors 301a through 301d, thereby improving the response speed of the LCD 1.

The above behavior of the liquid crystal molecules 302 may form the average azimuthal angle 310 in a different direction in each of the first through fourth domains Da through Dd. Referring back to FIGS. 1 and 2, in the first domain Da of the pixel PX, directors of the liquid crystal molecules 302 may be arranged obliquely in an upper right direction from the horizontal incision part 283, thereby defining the average azimuthal angle 310 in an 'a' direction.

In the second domain Db of the pixel PX, directors of the liquid crystal molecules 302 may be arranged obliquely in an upper left direction from the horizontal incision part 283, thereby defining the average azimuthal angle 310 in a 'b' direction.

In the third domain Dc of the pixel PX, directors of the liquid crystal molecules 302 may be arranged obliquely in a lower left direction from the horizontal incision part 283, thereby defining the average azimuthal angle 310 in a 'c' direction.

In the fourth domain Dd of the pixel PX, directors of the liquid crystal molecules 302 may be arranged obliquely in a lower right direction from the horizontal incision part 283, thereby defining the average azimuthal angle 310 in a 'd' direction.

Therefore, since liquid crystals may be controlled to be arranged in different directions along lengthwise directions of branch electrodes in a plurality of domains, lateral visibility of the LCD 1 of the invention may be improved.

The intensity of the fringe fields F1 to F4 applied to the edges of the pixel electrode 191 may be controlled by adjusting the width of the incision part 280. Further, a response time may be controlled by adjusting the size of the opening part 285 disposed at an intersection of the horizontal and vertical incision parts 283 and 286. The fringe fields F1 to F4 may not be provided in a region in which the incision part 280 is provided.

Referring back to FIGS. 3 and 4, a region in which the central electrode 192 and the micro-branch part 194 adjacent to the central electrode 192 are disposed may be defined as a first region X of one domain. In the first region X, due to the forces of the fringe fields F1 to F4 and the collision of the liquid crystal molecules 302, the liquid crystal molecules 302 may mostly be arranged in the direction of the average azimuthal angle 310 which is similar to the direction in which the branch electrodes 194a, 194b, 194c or 194d extend.

In FIG. 3, of the edges of the pixel PX, a side region (e.g., an upper side region) of the pixel electrode 191 which is separated from the central electrode 192 and parallel to the horizontal incision part 283 is defined as a second region Y, and a side region (e.g., a right side region) of the pixel electrode 191 which is parallel to the vertical incision part 286 is defined as a third region Z. In FIG. 4, a region in which the peripheral electrode 193 of the pixel electrode 191 and the first through third slit patterns 195a through 195c are disposed is defined as the third region Z, and a region in which the peripheral electrode 193 is not disposed is defined as the second region Y.

In the second region Y in FIG. 4, only the force of the first horizontal electric field F1 generated on an edge of the pixel PX may exist. Since only the third slit patterns 195c, not the first slit patterns 195a, are disposed in the second region Y, only the first directors 301a moved by the first horizontal electric field Fl may exist in the second region Y.

In other words, the liquid crystal molecules 302 having the first directors 301a may exist in the second region Y. In addition, since the second region Y is located far away from the third region Z of the pixel PX, the force of the second horizontal electric field F2 that defines the second directors 301b may be weak in the second region Y. Further, in the second region Y, some of the liquid crystal molecules 302 located adjacent to the vertical incision part 286 may be affected by the force of the fourth horizontal electric field F4, which defines the fourth directors 301d, due to the central electrode 192 having a large area.

As described above, a vector that rearranges the liquid crystal molecules 302 having the first directors 301a, that is, the second directors 301b provided by the force of the second horizontal electric field F2 hardly exist in the second region Y. Therefore, the liquid crystal molecules 302 disposed in the second region Y may lie parallel to the vertical incision part 286. Moreover, the component of the fourth horizontal electric field F4 generated by the vertical incision part 286 may move some liquid crystal molecules 302 from an acute angle to an obtuse angle. The same phenomenon may occur in the third region Z. Therefore, in the third region Z, some liquid crystal molecules 302 located adjacent to the horizontal incision part 283 may lie parallel to the horizontal incision part 283.

Therefore, of the liquid crystal molecules 302 moved by the fringe fields F1 to F4, some liquid crystal molecules 302 disposed in the second region Y may have the first directors 301a lying roughly parallel to the polarization axes of the first and second polarizing plates 140 and 240. In addition, when the peripheral electrode 193 of the illustrated exemplary embodiment is not disposed in the third region Z, the second directors 301b lying parallel to the polarization axes of the first and second polarizing plates 140 and 240 may be disposed in the third region Z.

The LCD 1 may have maximum transmittance when the direction of the average azimuthal angle 310 is at approximately 45 degrees to the polarization axes of the first and second polarizing plates 140 and 240 in response to the application of voltages to the first and second panels 100 and 200.

However, as described above, the liquid crystal molecules 302 may lie in a direction similar to the polarization axes of the first and second polarizing plates 140 and 240 in horizontal and vertical edge regions of the pixel electrode 191 adjacent to the horizontal and vertical incision parts 283 and 286. Accordingly, transmittance of the LCD 1 may be reduced in the second region Y of the pixel PX due to the liquid crystal molecules 302 lying in the direction similar to the polarization axes of the first and second polarizing plates 140 and 240. That is, in the second region Y, an angle defined by the liquid crystal molecules 310 and the polarization axes of the first and second polarizing plates 140 and 240 is far from more than approximately 45 degrees, thereby reducing light transmittance.

In the third region Z in which the peripheral electrode 193 is disposed, the first through third slit patterns 195a through 195c may be disposed. Since the peripheral electrode 193 is provided in the edge region of the pixel PX, a fringe field may be generated between the peripheral electrode 193 and the first slit patterns 195a. The fringe field may cause the liquid crystal molecules 302 located in a region in which the second slit patterns 195b are disposed to collide with each other. Accordingly, in the third region Z, the liquid crystal molecules 302 may be arranged in a direction similar to the average azimuthal angle 310.

More specifically, referring to FIG. 5, in a portion of the third region Z which is adjacent to the horizontal incision part 283, horizontal electric field components having the directions of the third directors 301c disposed in the peripheral electrode 193 and the directions of the second directors 301b disposed at lower ends of the first branch electrodes 194a of the first domain Da may move the liquid crystal molecules 302.

In other words, in a portion of the third region Z which is adjacent to the incision part 280, vectors of the second and third horizontal electric fields F2 and F3 that move the liquid crystal molecules 302 in the directions of the third directors 301c and the second directors 301b may move the liquid crystal molecules 302 from an acute angle to an obtuse angle, thereby reducing transmittance.

To solve this problem, the LCD 1 according to the invention may have the peripheral electrode 193 disposed in the edge region of the pixel PX.

In this case, a fringe field may be generated between the first slit patterns 195a and the peripheral electrode 193. Therefore, a fifth horizontal electric field F5 may be generated in a direction from ends of the first slit patterns 195a toward the peripheral electrode 193.

In the third region Z in which the peripheral electrode 193 is disposed, the fifth horizontal electric field F5 generated by a side of the pixel electrode 191 and the third horizontal electric field F3 generated by a side of the incision part 280 which is adjacent to the side of the pixel electrode 191 may be major horizontal electric field components.

In addition, the component of the fourth horizontal electric field F4 may be generated around the vertical incision part 286. The component of the fourth horizontal electric field F4 may not affect the third region Z because the vertical incision part 286 is located far away from the third region Z. The fifth horizontal electric field F5 may be generated at a left boundary of the peripheral electrode 193 and may have a direction facing the side of the pixel electrode 191, that is, an opposite direction to the second horizontal electric field F2.

Fourth and $(3-1)^{th}$ directors 301d and 301d' moved by the fifth horizontal electric field F5 and the third horizontal electric field F3 may collide with each other, thus creating a vector that may rearrange the liquid crystal molecules 302 disposed on the peripheral electrode 193. Therefore, in the third region Z, the liquid crystal molecules 302 moved in directions of the fourth and $(3-1)^{th}$ directors 301d and 301d' may collide each other to be rearranged at an azimuthal angle similar to the average azimuthal angle 310. Here, the magnitude of the fifth horizontal electric field F5 in the edge region of the pixel PX may vary according to the distance from the incision part 280 and the widths of the second slit patterns 195b. In an exemplary embodiment, the incision part 280 may have a width of approximately 2 μm to approximately 5 μm.

Therefore, a fringe field that may rearrange the liquid crystal molecules 302 may be generated in the edge region of the pixel PX, that is, in the third region Z. The fringe field may cause the liquid crystal molecules 302 to be arranged in an average alignment direction in the first domain Da, that is, in a direction relatively close to the average azimuthal angle 310 of the first domain Da. Accordingly, this reduces a reduction in transmittance due to the irregular arrangement of the liquid crystal molecules 302 in the edge region of the pixel PX.

As described above, the LCD 1 has the peripheral electrode 193 disposed on the sides thereof. Therefore, the liquid crystal molecules 302 initially arranged in the direction similar to the polarization axes of the first and second polarizing plates 140 and 240 may be rearranged at the average azimuthal angle 310, thereby improving transmittance and lateral viewing angle in the third region Z. In an exemplary embodiment, to improve the lateral viewing angle of the LCD 1 according to the invention, the peripheral electrode 193 may be placed only on both lateral sides of the pixel PX as illustrated in FIG. 4.

Therefore, defining the second slit patterns 195b in the pixel electrode 191 and minimizing liquid crystals arranged in the direction matching the polarization axes of the first and second polarizing plates 140 and 240 may improve transmittance.

Referring to FIG. 3, in the first region X, the liquid crystal molecules 302 are moved by the effect of a fringe field as described above. Here, the liquid crystal molecules 302 may collide with each other in a direction in which they are moved. Accordingly, the liquid crystal molecules 302 may be arranged in a direction of approximately 45 degrees which is parallel to the direction in which the branch electrodes 194*a*, 194*b*, 194*c* or 194*d* extend.

The peripheral electrode 193 may be disposed in both the second region Y and the third region Z. Therefore, a fringe field may be generated between the ends of the first slit patterns 195*a* and the peripheral electrode 193 in each of the second and third regions Y and Z.

That is, the fringe field may cause the liquid crystal molecules 302 to collide with each other in each of the second and third regions Y and Z. Accordingly, the liquid crystal molecules 302 in the second and third regions Y and Z may be arranged in a direction similar to the average azimuthal angle 310. The peripheral electrode 193 may be placed in the second and third regions Y and Z in which the liquid crystal molecules 302 are not controlled and thus are arranged at an azimuthal angle similar to the polarization axes.

Here, the azimuthal angle of the liquid crystal molecules 302 may be determined by the sum of a vector created by an electric field and a vector created by the collision of liquid crystals. To create a force that moves the liquid crystal molecules 302, the azimuthal angle of liquid crystals may be controlled by patterning the pixel electrode 191 and the common electrode 270 in one pixel PX.

In addition, an electric field may be generated in the liquid crystal layer 300 by patterning the pixel electrode 191 and the common electrode 270 in one pixel PX. By controlling the azimuthal angle of the liquid crystals using the electric field, the liquid crystal molecules 302 may be arranged in a direction similar to the average azimuthal angle 310, thereby improving the viewing angle of the LCD 1.

Therefore, a vector that may rearrange the liquid crystal molecules 302 located adjacent to an edge of the pixel electrode 191 may be provided. The vector may prevent the liquid crystal molecules 302 located adjacent to the edge of the pixel electrode 191 from tilting in a direction perpendicular to the edge of the pixel electrode 191. That is, the vector may prevent a reduction in display quality that occurs when the liquid crystal molecules 302 are arranged in a direction parallel to the polarization axes on edges of the pixel electrode 191, that is, in the second and third regions Y and Z.

Therefore, placing the peripheral electrode 193 of the pixel electrode 191 in the edge region of the pixel PX and minimizing the liquid crystal molecules 302 arranged in the direction matching the polarization axes of the first and second polarizing plates 140 and 240 may improve transmittance.

Figure 9:
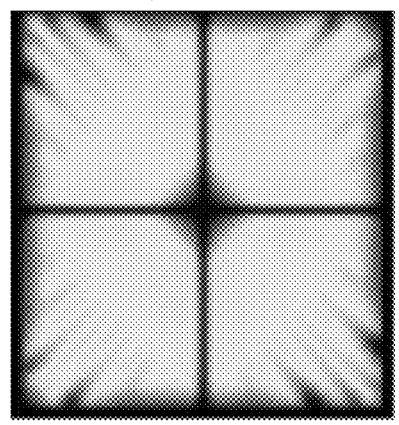
Figure 10:
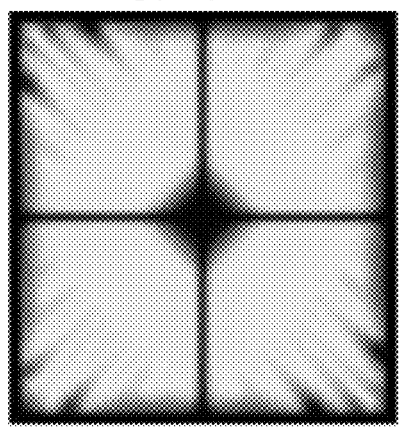
Figure 11:
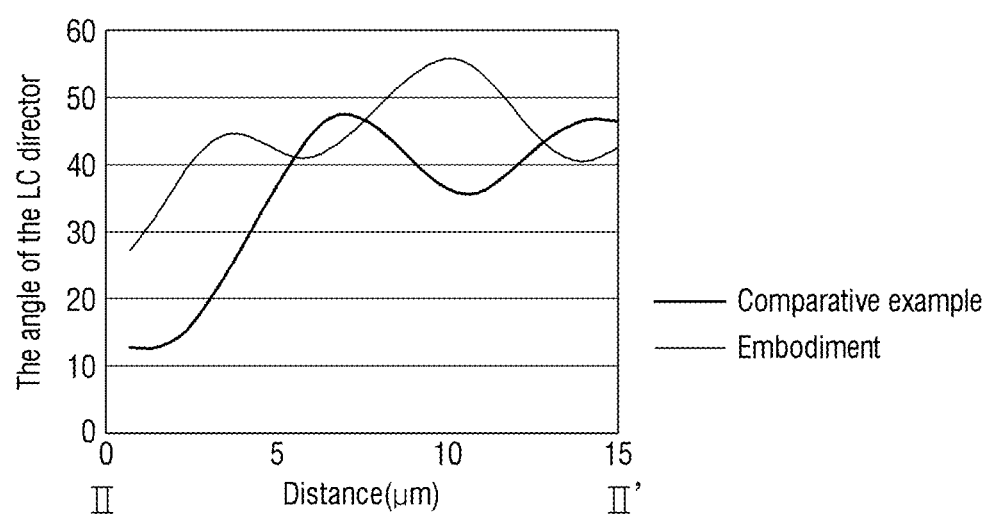
FIG. 11 is a graph illustrating the distribution of azimuthal angles of an exemplary embodiment and a comparative example of liquid crystal molecules in pixels of LCDs according to the invention.
Figure 12:
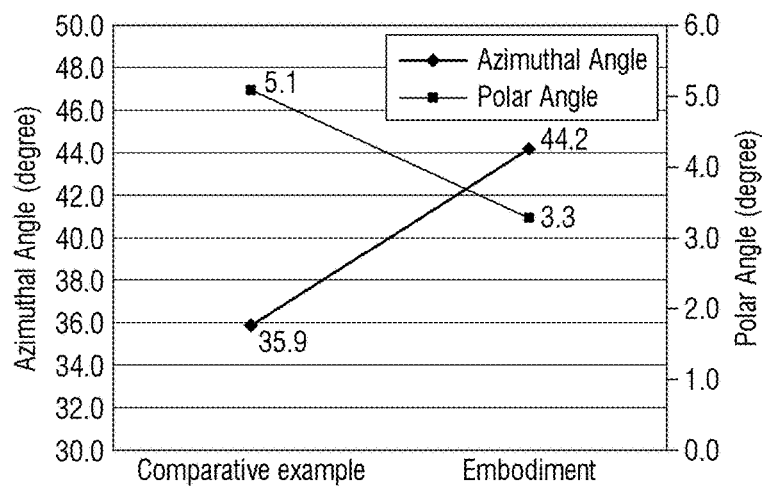
FIG. 12 is a graph illustrating polar angles and azimuthal angles of an exemplary embodiment and a comparative example of liquid crystals of LCDs according to the invention.
Figure 13:
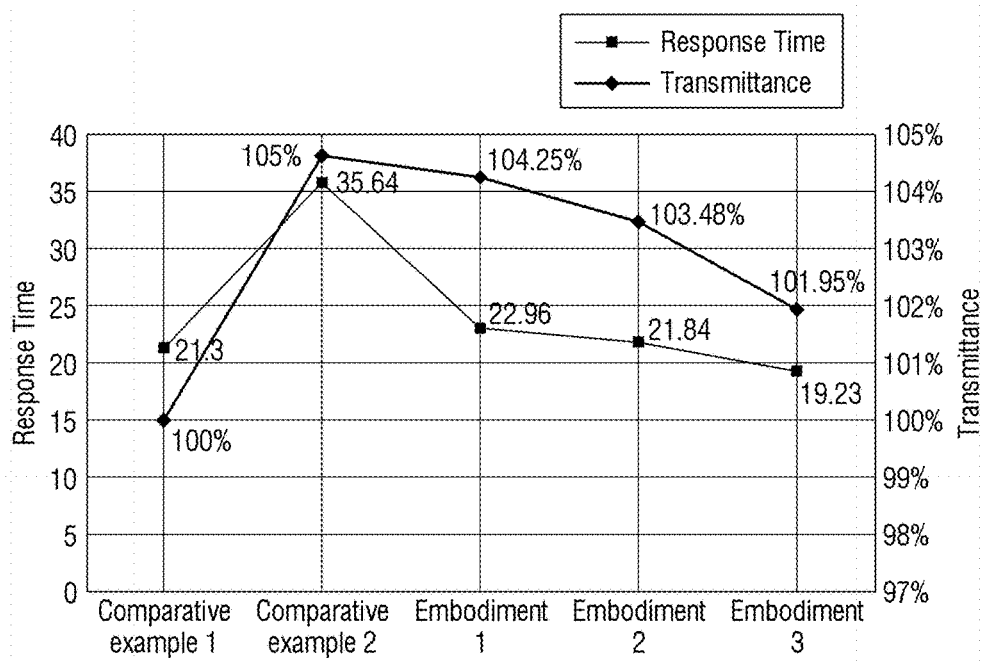
FIG. 13 is a graph illustrating transmittance and response speed of exemplary embodiments and comparative examples of LCDs according to the invention.

FIGS. 6 through 10 are planar images of pixels according to exemplary embodiments and comparative examples of the invention. FIG. 11 is a graph illustrating the distribution of azimuthal angles of liquid crystal molecules in pixels of LCDs according to an exemplary embodiment and a comparative example of the invention. FIG. 12 is a graph illustrating polar angles and azimuthal angles of liquid crystals of LCDs according to an exemplary embodiment and a comparative example of the invention. FIG. 13 is a graph illustrating transmittance and response speed of LCDs according to exemplary embodiments and comparative examples of the invention.

Here, a description of FIGS. 6 through 13 will be given briefly by citing FIGS. 1 through 5 or omitted in order to avoid redundancy.

Figure 6:
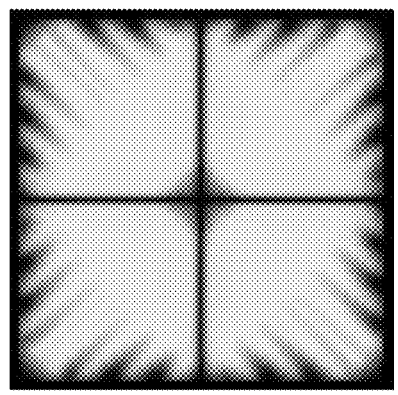
FIGS. 6 through 10 are planar images of exemplary embodiments and comparative examples of pixels according to the invention.
Figure 7:
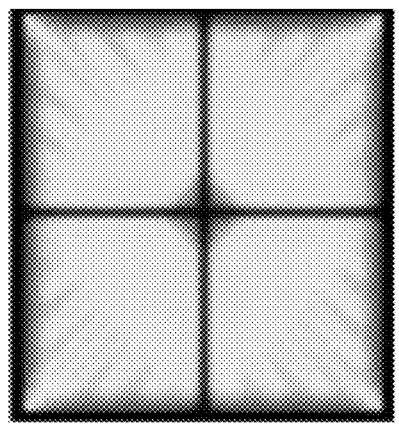
Figure 8:
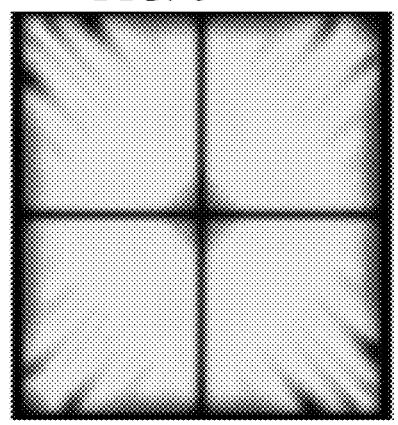

FIGS. 6 and 7 are captured images of pixels according to comparative examples of the invention. FIGS. 8 through 10 are captured images of pixels according to exemplary embodiments of the invention. Specifically, FIG. 6 is a captured image of a pixel without a peripheral electrode according to a comparative example of the invention. FIG. 7 is a captured image of a pixel having a peripheral electrode disposed in the entire edge region thereof according to another comparative example of the invention. FIG. 8 is a captured image of a pixel having a peripheral electrode disposed in part of an edge region thereof and having an opening part with a width of approximately 2 µm to approximately 5 µm according to Embodiment 1 of the invention. FIGS. 9 and 10 are images of pixels having the opening part of FIG. 8 enlarged according to Embodiments 2 and 3 of the invention. FIG. 11 illustrates the distribution of azimuthal angles of liquid crystal molecules disposed in a region corresponding to line II-II' of FIG. 1.

Referring to FIGS. 6 through 10, an LCD 1 according to the invention includes, in each domains of a pixel PX, first slit patterns 195*a* which separate a peripheral electrode 193 from ends of branch electrodes 194*a*, 194*b*, 194*c* or 194*d*, second slit patterns 195*b* which extend from a central electrode 192 to a corner pattern 195*d*, and third slit patterns 195*c* which extend from the central electrode 192 to edges of the pixel PX. For ease of description, a third region Z will be described as an example.

When liquid crystal molecules 302 having first through fourth directors 301*a* through 301*d* moved by fringe fields are arranged parallel to polarization axes, transmittance may be reduced. However, the liquid crystal molecules 302 disposed on the first slit patterns 195*a* and the peripheral electrode 193 adjacent to a horizontal incision part 283 may be controlled to have an average azimuthal angle 310 by a component of a fifth horizontal electric field F5 generated by the first slit patterns 195*a* and the peripheral electrode 193.

Referring to FIG. 6, the peripheral electrode 193 is not disposed in an edge region of the pixel PX. Since a second region Y is located far away from the third region Z, the force of a component of a first horizontal electric field F1 in the second region Y may hardly reach the third region Z located adjacent to the horizontal incision part 283. Accordingly, a component of a third horizontal electric field F3 and a component of a second horizontal electric field F2 may act as major electric fields in the third region Z. Due to the sum of vectors of the two components, the liquid crystal molecules 302 may be arranged at a different azimuthal angle from the average azimuthal angle 310.

Here, the components of the third and second horizontal electric fields F3 and F2 may cause the average azimuthal angle 310 in the third region Z to become close to the polarization axes of first and second polarizing plates 140 and 240, thereby reducing transmittance.

Referring to FIGS. 7 and 8, the peripheral electrode 193 is disposed in the edge region of the pixel PX. In FIG. 7, the peripheral electrode 193 is disposed as a single piece in the entire edge region of the pixel PX. In FIG. 8, the peripheral electrode 193 is disposed in part of the edge region of the pixel PX. In FIG. 8, the corner pattern 195*d* may be disposed in each corner region of the pixel PX.

In the pixel PX having the peripheral electrode 193, the component of the fifth horizontal electric field F5 may be generated by the peripheral electrode 193. The component of the fifth horizontal electric field F5 may cause the liquid crystal molecules 302 in the second region Y or the third region Z to be arranged at an azimuthal angle similar to the average azimuthal angle 310. Therefore, transmittance may be improved in the second region Y or the third region Z, that is, on both lateral sides of the pixel PX or on upper and lower sides of the pixel PX. In FIG. 8, since each corner region of the pixel PX is located far away from an opening part 285, the control over liquid crystals is reduced in each corner region, thereby reducing response speed.

Referring to FIGS. 9 and 10, the area of the opening part 285 is increased from the structure of the pixel PX of FIG. 8. The increased area of the opening part 285 may ensure the control over liquid crystals disposed in the pixel PX. FIG. 9 shows a pixel PX having the size of the opening part 285 increased by approximately 2 μm from FIG. 8 according to Embodiment 2 of the invention. FIG. 10 shows a pixel PX having the size of the opening part 285 increased by approximately 5 μm from FIG. 8 according to Embodiment 3 of the invention.

Increasing the area of the opening part 285 as described above may reduce a reduction in transmittance, control over liquid crystals and response speed resulting from an increase in the area of a pixel electrode 191.

Transmittance and response speed in the above pixel structures according to the comparative examples and the embodiments of the invention were measured. In FIG. 11, azimuthal angles of liquid crystals disposed in the region II-II' of FIG. 1 were measured.

Referring to FIG. 11, an average azimuthal angle of liquid crystals was measured in a region extending from an edge of a pixel PX, that is, an edge of the peripheral electrode 193 to part of the central electrode 192 in Embodiment 1 and in a region similar to the region II-II' of FIG. 1 in Comparative Example 1.

The average azimuthal angle of liquid crystals within a distance of approximately 5 μm from the edge of the pixel PX, that is, in a region in which the peripheral electrode 193 is disposed was measured to be close to approximately 45 degrees in Embodiment 1, whereas the average azimuthal angle of liquid crystals within a distance of approximately 1 μm to approximately 8 μm from the edge of the pixel PX was measured to be approximately 40 degrees or less in Comparative Example 1.

Therefore, it may be understood that horizontal electric field components are generated on an edge of the pixel PX, i.e., in the second region Y or the third region Z by the peripheral electrode 193 and that the liquid crystal molecules 302 are controlled by the horizontal electric field components to be arranged at the average azimuthal angle 310.

The peripheral electrode 193, when disposed on an edge of the pixel PX, may define a vector that may rearrange the liquid crystal molecules 302 located adjacent to the edge of the pixel electrode 191. Accordingly, the liquid crystal molecules 302 located adjacent to the edge of the pixel electrode 191 may be prevented from tilting in a direction perpendicular to the edge of the pixel electrode 191. That is, the peripheral electrode 193 may prevent a reduction in display quality that occurs when the liquid crystal molecules 302 disposed on the edge of the pixel electrode 191, that is, in the third region Z are arranged in a direction parallel to the polarization axes. In addition, the peripheral electrode 193 may cause the liquid crystal molecules 302 to be arranged at the average azimuthal angle 310, thereby improving transmittance.

Referring to FIGS. 11 and 12, a polar angle of the LCD 1 according to the invention refers to an angle at which liquid crystals are lying on a contact surface according to the control over liquid crystals. The polar angle is approximately 0 degree when the liquid crystals are completely lying on the surface and approximately 90 degrees when the liquid crystals are arranged perpendicular to the surface as in a case where no electric field is generated.

Here, when the liquid crystal molecules 302 are completely lying on the contact surface at an angle of nearly 0 degree due to the effect of an electric field, transmittance may be at a maximum. In some cases, the liquid crystals may not be completely lying on the surface but may be lying at a certain polar angle. In this case, transmittance may be reduced. Therefore, as the polar angle of the liquid crystal molecules 302 is lower, the transmittance becomes higher, and as the azimuthal angle is closer to approximately 45 degrees, the transmittance becomes higher.

The polar angle averaged approximately 5.1 degrees in Comparative Example 1 and approximately 3.3 degrees in Embodiment 1. This may be understood that the peripheral electrode 193 disposed in the edge region of the pixel PX as in Embodiment 1 improved the control over liquid crystals in the second and third regions Y and Z where the control over liquid crystals is relatively low. When Comparative Example 1 and Embodiment 1 are compared only in terms of polar angle, transmittance is higher in Embodiment 1. The polar angle may affect front luminance and lateral luminance of the LCD 1. That is, the polar angle may affect the overall luminance of the LCD 1.

Referring to FIG. 12, the average azimuthal angle 310 averaged approximately 35.9 degrees in Comparative Example 1 and approximately 44.2 degrees in Embodiment 1. This may be understood that the peripheral electrode 193 disposed in the edge region of the pixel PX increased the average azimuthal angle 310 of the liquid crystal molecules 302 in the second region Y and the third region Z from an average of less than approximately 40 degrees to an average of approximately 40 degrees to approximately 45 degrees.

As apparent from the results of measuring the average azimuthal angle and the polar angle, Embodiment 1 has higher transmittance than Comparative Example 1. That is, it may be understood that the transmittance of the pixel PX was increased by the peripheral electrode 193 disposed in the edge region of the pixel PX.

Referring to FIG. 13, the area of the pixel electrode 191 in the pixel PX is increased in Comparative Example 2 and Embodiments 1 through 3 compared with Comparative Example 1. The increased area of the pixel electrode 191 may reduce response speed. In FIG. 13, an increase in transmittance is illustrated based on the assumption that transmittance of Comparative Example 1 is 100%.

In Comparative Example 1, transmittance was measured to be 100%, and response speed was measured to be approximately 21.3 milliseconds (ms)

In Comparative Example 2 in which the peripheral electrode 193 is disposed in the entire edge region of the pixel PX, transmittance was increased from Comparative Example 1 by 5% to become 105%. However, since the area of the pixel electrode 191 was increased by the peripheral electrode 193 disposed in the entire edge region of the pixel PX, response speed was reduced to approximately 35.64 ms.

In Embodiment 1 in which the peripheral electrode 193 is disposed in part of the edge region of the pixel PX, transmittance was increased from Comparative Example 1 by 4.25% to become 104.25%. In addition, since the peripheral electrode 193 is disposed in part of the edge region of the pixel PX, the area of the pixel electrode 191 was increased. However, response speed was measured to be approximately 22.96 ms which is similar to the response speed of Comparative Example 1.

In Embodiment 2 in which the peripheral electrode 193 is disposed in part of the edge region of the pixel PX and the area of the opening part 285 is increased from Embodiment 1 by approximately 2 μm, transmittance was increased from Comparative Example 1 by 3.48% to become 103.48%. In Embodiment 2, an area in which liquid crystals are moved is reduced due to the increased area of the opening part 285. Thus, transmittance was reduced compared with Embodiment 1.

In Embodiment 2, the peripheral electrode 193 is disposed in part of the edge region of the pixel PX, and the area of the opening part 285 is increased. Therefore, the control over liquid crystals was improved, thereby slightly increasing the response speed to 21.84 ms compared with Embodiment 1.

In Embodiment 3 in which the peripheral electrode 193 is disposed in part of the edge region of the pixel PX and the area of the opening part 285 is increased from Embodiment 1 by approximately 5 μm, transmittance was increased from Comparative Example 1 by approximately 1.95% to become approximately 101.95%. In Embodiment 3, the area in which liquid crystals are moved is reduced due to the increased area of the opening part 285. Thus, transmittance was significantly reduced compared with Embodiment 1.

In Embodiment 3, the peripheral electrode 193 is disposed in part of the edge region of the pixel PX, and the area of the opening part 285 is increased. Therefore, the control over liquid crystals was improved, thereby increasing the response speed to 19.23 ms compared with Embodiment 1.

In summary, of Comparative Examples 1 and 2 and Embodiments 1 through 3, Embodiment 1 showed best performance, that is, similar response speed but higher transmittance.

FIGS. 14 through 21 are plan views of pixels of LCDs according to other exemplary embodiments of the invention. Here, a description of FIGS. 14 through 21 will be given briefly by citing FIGS. 1 through 5 or omitted in order to avoid redundancy.

A pixel electrode 191 of an LCD 1 according to the invention includes a central electrode 192 which is disposed in a central region of a pixel PX and a micro-branch part 194 which extends from a side of the central electrode 192. The micro-branch part 194 includes a plurality of branch electrodes 194a through 194d, and first through third slit patterns 195a through 195c may be disposed between the branch electrodes 194a through 194d to expose an insulating layer including a passivation layer.

The pixel electrode 191 of the pixel PX may include a peripheral electrode 193 disposed in an edge region thereof. Here, the central electrode 192, the branch electrodes 194a through 194d and the peripheral electrode 193 of the pixel electrode 191 may be connected to each other.

In each domain of the pixel PX, the first slit patterns 195a may separate some of the branch electrodes 194a, 194b, 194c or 194d of the micro-branch part 194. Ends of the first slit patterns 195a disposed along a lengthwise direction of the branch electrodes 194a, 194b, 194c or 194d may contact the central electrode 192, and the other ends thereof may contact the peripheral electrode 193.

The second slit patterns 195b may separate some of the branch electrodes 194a, 194b, 194c or 194d of the micro-branch part 194 from each other. Ends of the second slit patterns 195b disposed along the lengthwise direction of the branch electrodes 194a, 194b, 194c or 194d may contact the central electrode 192, and the other ends thereof may contact the corner pattern 195d.

The third slit patterns 195c may separate some of the branch electrodes 194a, 194b, 194c or 194d of the micro-branch part 194 from each other. Ends of the third slit patterns 195c disposed along the lengthwise direction of the branch electrodes 194a, 194b, 194c or 194d may contact the central electrode 192, and the other ends thereof may extend up to the edge region of the pixel PX.

Figure 14:
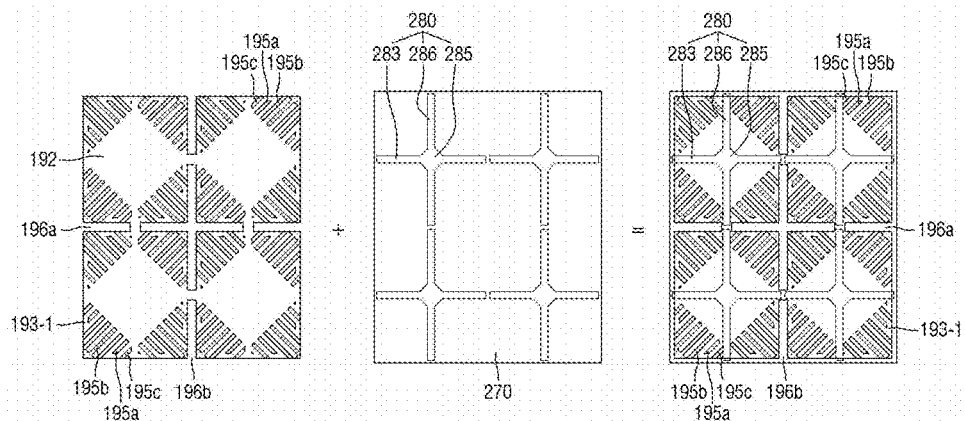
FIGS. 14 through 21 are plan views of other exemplary embodiments of pixels of LCDs according to the invention.
Figure 15:
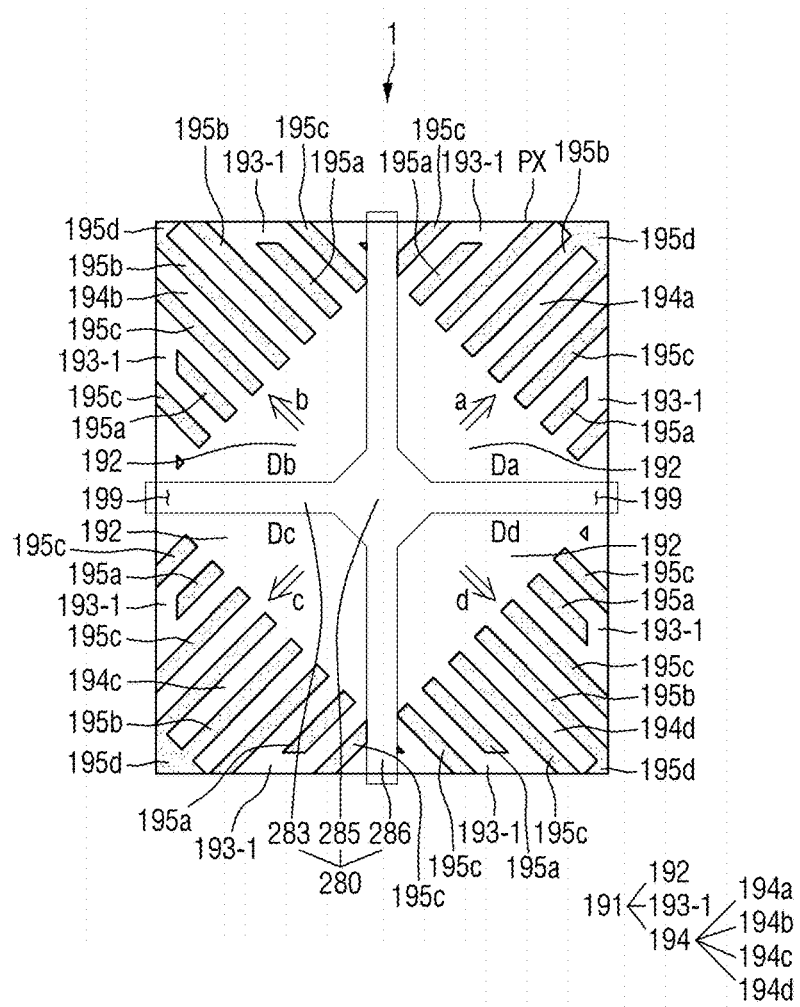

Referring to FIGS. 14 and 15, a dot-shaped peripheral electrode 193-1 may be disposed along a lengthwise direction of each of horizontal and vertical incision parts 283 and 286 in a pixel PX. The dot-shaped peripheral electrode 193-1 may be disposed on left, right, upper and lower edges of the pixel electrode 191.

In a region in which the dot-shaped peripheral electrode 193-1 is disposed adjacent to each of the horizontal and vertical incision parts 283 and 286, the first and third slit patterns 195a and 195c may be alternately arranged. The dot-shaped peripheral electrode 193-1 may be connected to the central electrode 192 by the branch electrodes 194a, 194b, 194c or 194d.

As described above, a vector that may rearrange liquid crystal molecules 302 located adjacent to an edge of the pixel electrode 191 may be provided. The vector may prevent the liquid crystal molecules 302 located adjacent to the edge of the pixel electrode 191 from tilting in a direction perpendicular to the edge of the pixel electrode 191. That is, the vector may prevent a reduction in display quality that occurs when the liquid crystal molecules 302 are arranged in a direction parallel to polarization axes on the edge of the pixel electrode 191, that is, in a third region Z.

Therefore, the dot-shaped peripheral electrode 193-1 may improve transmittance by increasing the control over liquid crystals of the LCD 1 and increase response speed by reducing the area of the pixel electrode 191.

As illustrated in FIGS. 14 and 15, ends of the dot-shaped peripheral electrode 193-1 and ends of the third slit patterns 195c may be alternately arranged in neighboring pixels PX.

Here, a gap 196 may be disposed between the neighboring pixels PX. The gap 196 may include a horizontal gap 196a which separates the pixels PX in a horizontal direction and a vertical gap 196b which separates the pixels in a vertical direction. The gap 196 may be provided as an insulating layer that exposes the passivation layer and separates the neighboring pixels PX. In a region in which the gap 196 is disposed, thin-film transistor ("TFT") conducting wires for controlling the pixels PX and protrusions for providing a pretilt angle to the liquid crystal molecules 302 may be disposed.

The third slit patterns 195c disposed adjacent to the dot-shaped peripheral electrode 193-1 located at a boundary between the pixels PX may generate a horizontal electric field component. The horizontal electric field component may increase liquid crystal molecules 302 arranged at an average azimuthal angle 310 of approximately 45 degrees at which transmittance is highest from among the liquid crystal molecules 302 disposed on the peripheral electrode 193-1 and the third slit patterns 195c.

Therefore, the dot-shaped peripheral electrode 193-1 may improve transmittance by increasing the control over liquid crystals of the LCD 1 and increase response speed by reducing the area of the pixel electrode 191.

Figure 16:
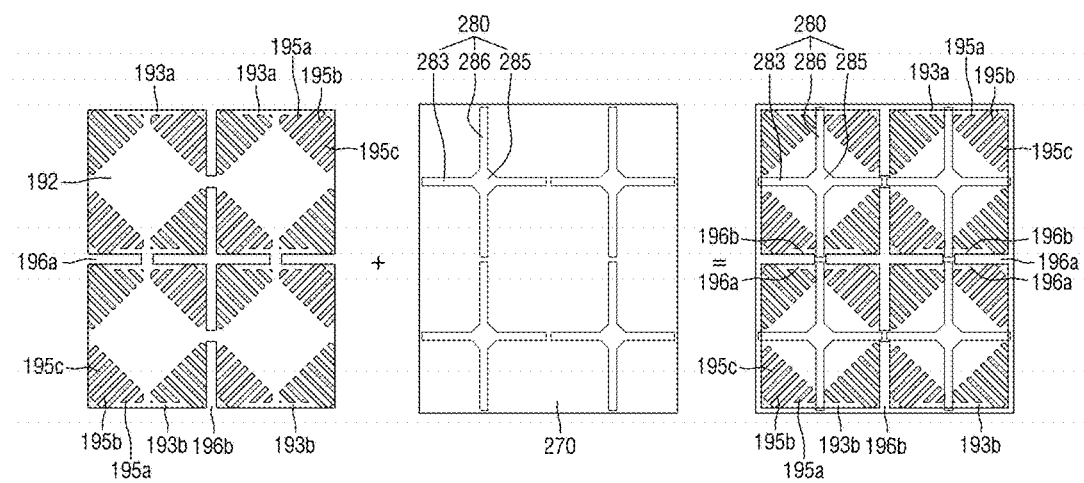
Figure 17:
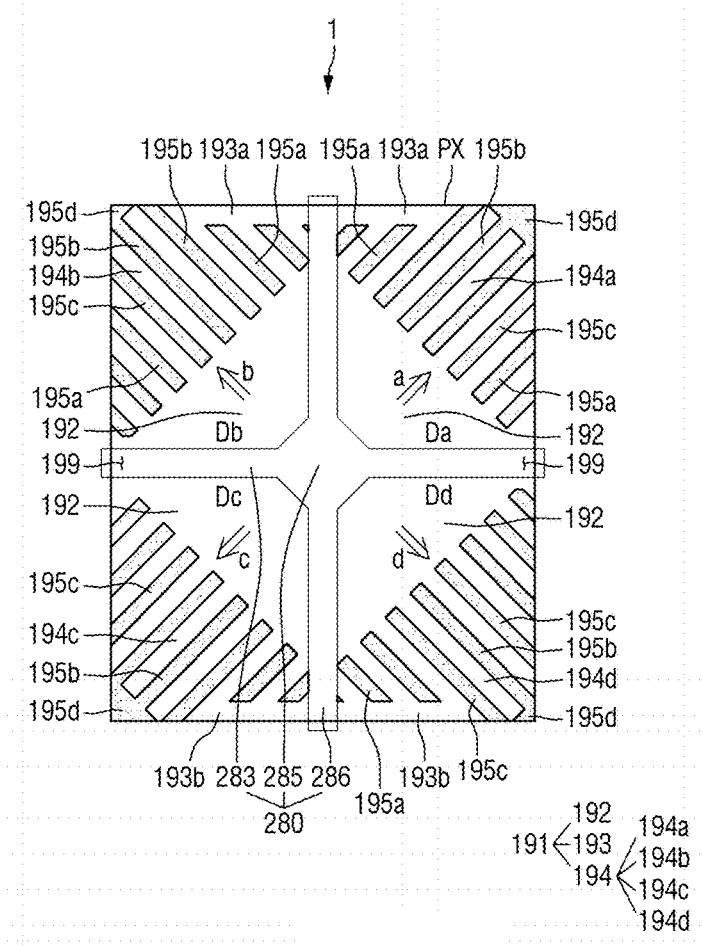

Referring to FIGS. 16 and 17, a peripheral electrode 193 may be disposed on each of upper and lower edges of a pixel PX. An upper peripheral electrode 193a disposed on the upper edge of the pixel PX may be adjacent to a lower peripheral electrode 193b of a neighboring pixel PX.

Figure 18:
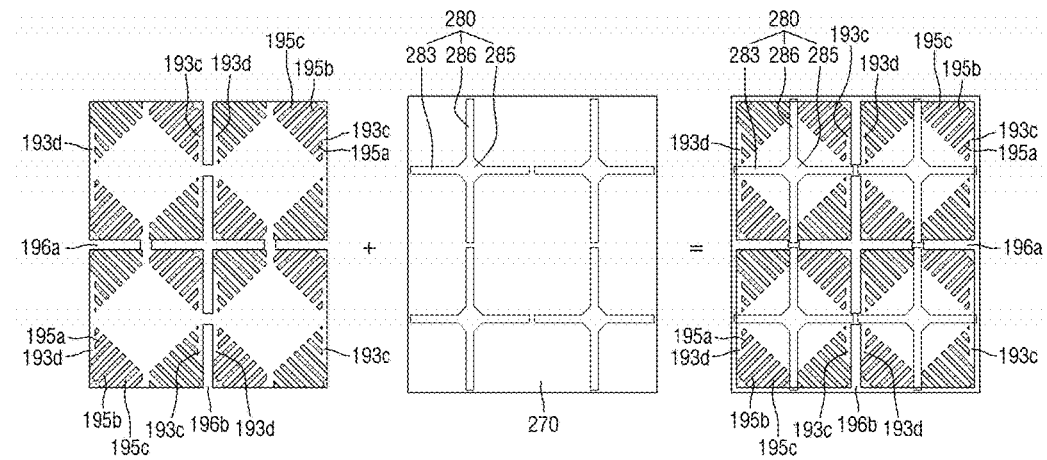
Figure 19:
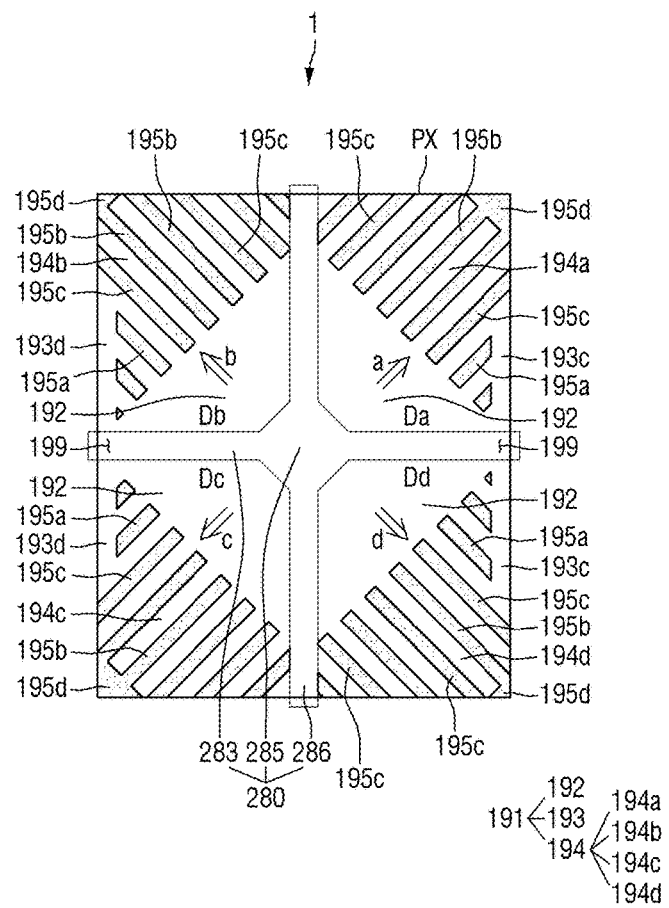

Referring to FIGS. 18 and 19, a peripheral electrode 193 may be disposed on each of left and right edges of a pixel PX. A right peripheral electrode 193c disposed on the right edge of the pixel PX may be adjacent to a left peripheral electrode 193d of a neighboring pixel PX.

Since the upper and lower peripheral electrodes 193a and 193b or the left and right peripheral electrodes 193c and 193d are placed adjacent to each other, the control over liquid crystals around the upper and lower peripheral electrodes 193a and 193b or the left and right peripheral electrodes 193c and 193d may further be improved.

Referring to FIGS. 16 through 19, since the upper and lower peripheral electrodes 193a and 193b or the left and right peripheral electrodes 193c and 193d are disposed adjacent to each other, the control over liquid crystals around the upper and lower peripheral electrodes 193a and 193b or the left and right peripheral electrodes 193c and 193d may be improved. Accordingly, more liquid crystal molecules 302 are likely to have the average azimuthal angle 310. Therefore, as the improved control over liquid crystals increases the liquid crystal molecules 302 having the average azimuthal angle 310, the transmittance of a pixel PX may be increased. In addition, since the peripheral electrode 193 is provided not on all edges of the pixel PX, the area of the pixel electrode 191 may be reduced, thereby improving response speed.

Figure 20:
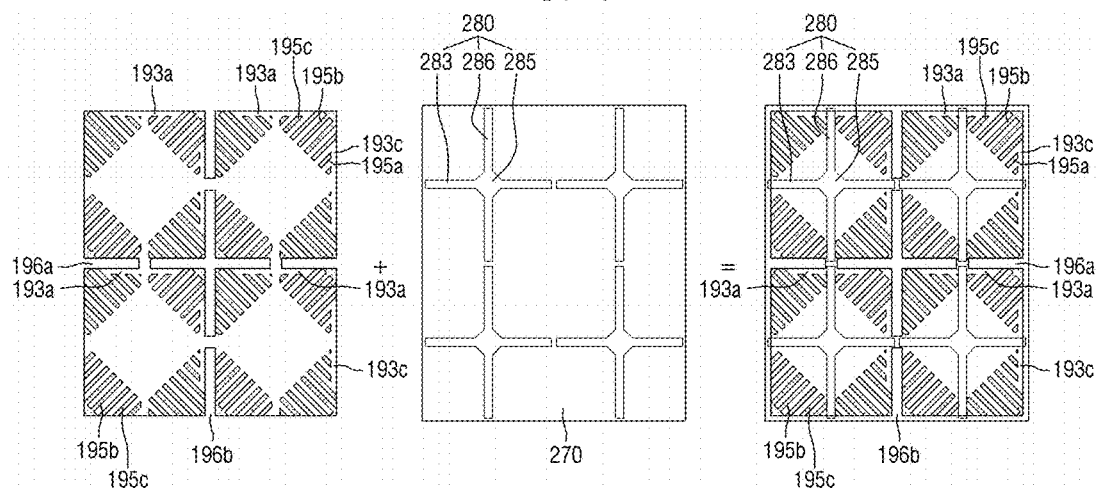
Figure 21:
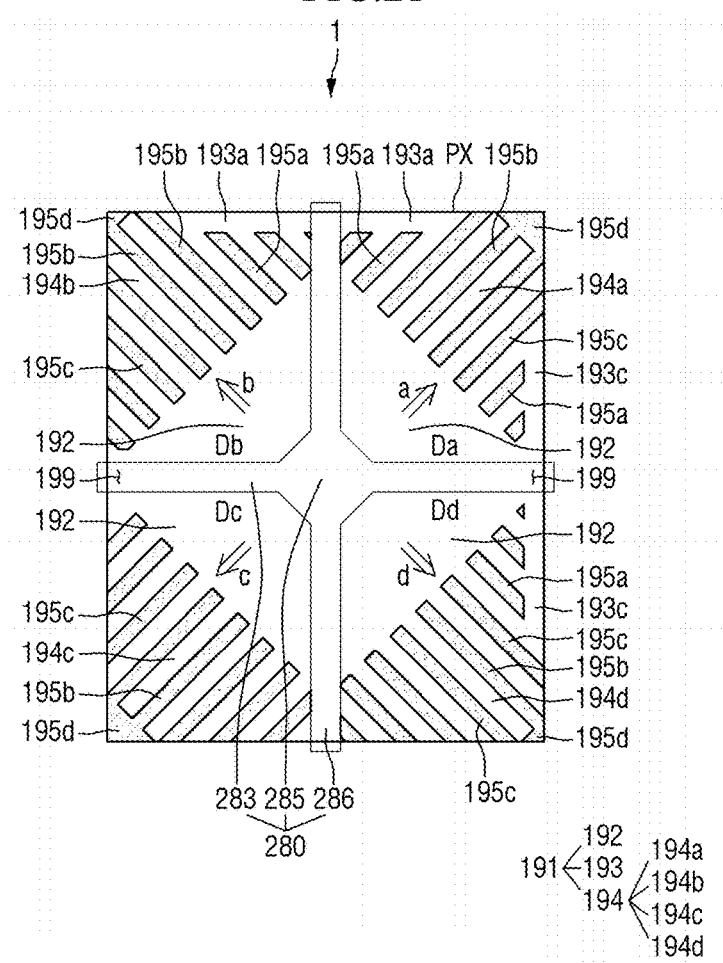

Referring to FIGS. 20 and 21, a peripheral electrode 193 may be disposed on any one of upper and lower edges of a pixel PX and additionally on any one of right and left edges of the pixel PX. In an exemplary embodiment, an upper peripheral electrode 193a, and a right peripheral electrode 193c may be disposed. In an alternative exemplary embodiment, a lower peripheral electrode 193b (refer to FIG. 17) and a left peripheral electrode 193d (refer to FIG. 19) may be placed. As described above, the peripheral electrode 193 may be placed in any one direction of the pixel PX.

Accordingly, as illustrated in FIG. 21, a region of the pixel PX in which the peripheral electrode 193 is not disposed may be adjacent to a region of a neighboring pixel PX in which the peripheral electrode 193 is disposed.

As described above, the area of the peripheral electrode 193 may be reduced, and the control over liquid crystals in a neighboring pixel PX may be improved using the peripheral electrode 193, thereby improving transmittance. In addition, response speed may be improved by reducing the area of a pixel electrode.

Figure 22:
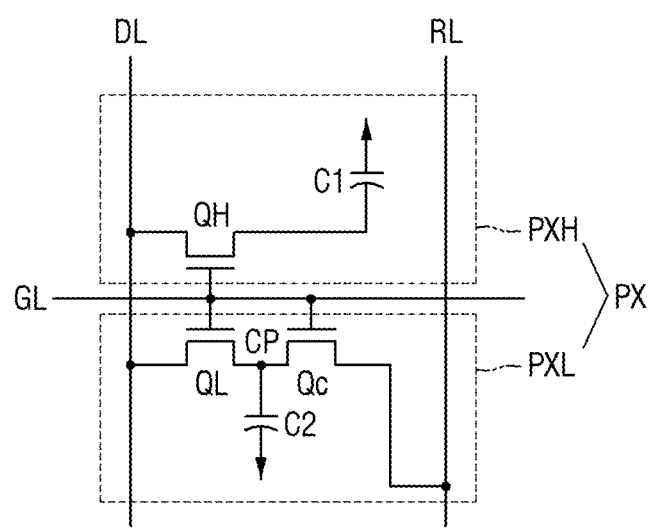
FIG. 22 is an equivalent circuit diagram of an exemplary embodiment of one pixel of an LCD according to the invention.
Figure 23:
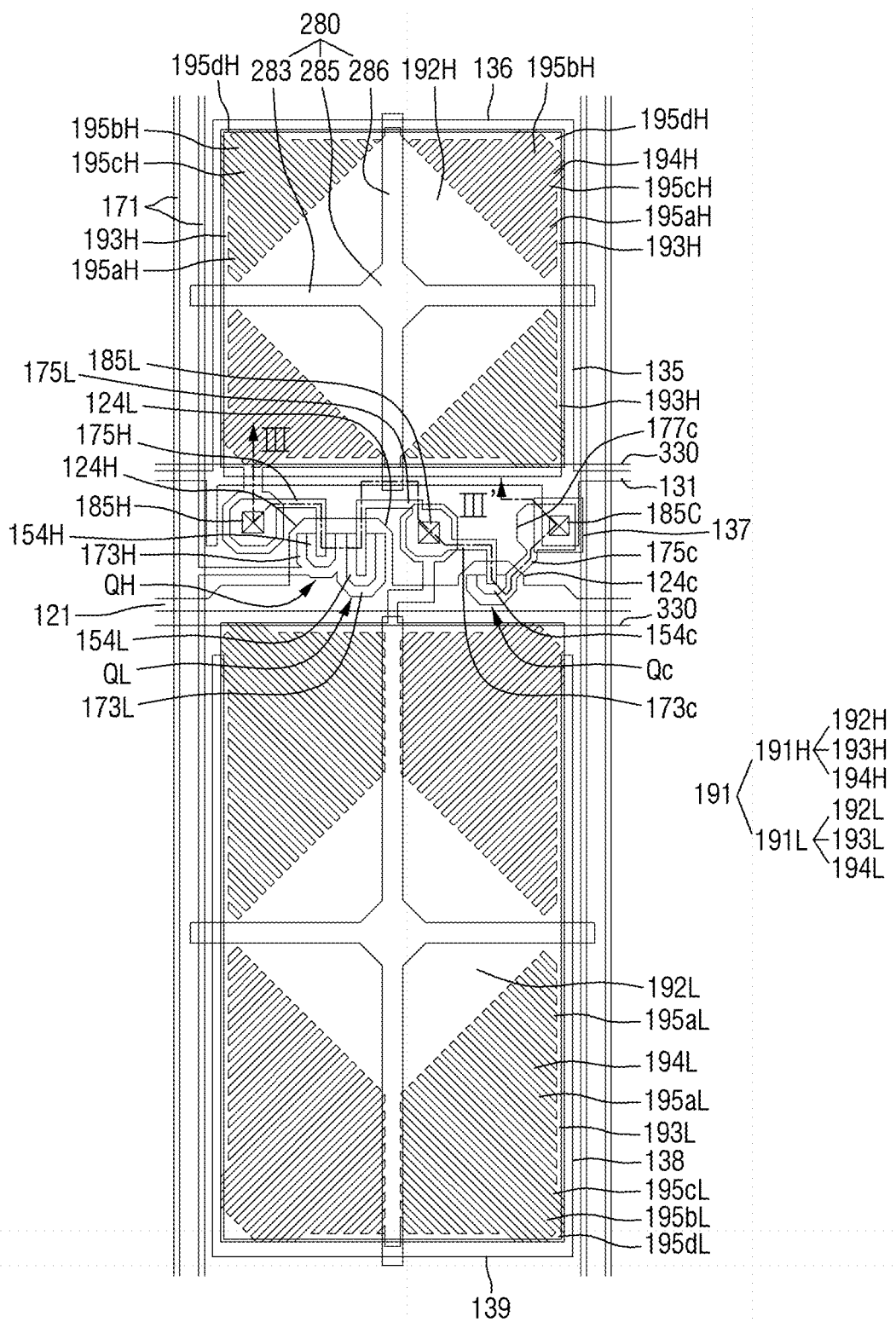
FIG. 23 is a plan view of one pixel of the LCD having the equivalent circuit of FIG. 22.
Figure 24:
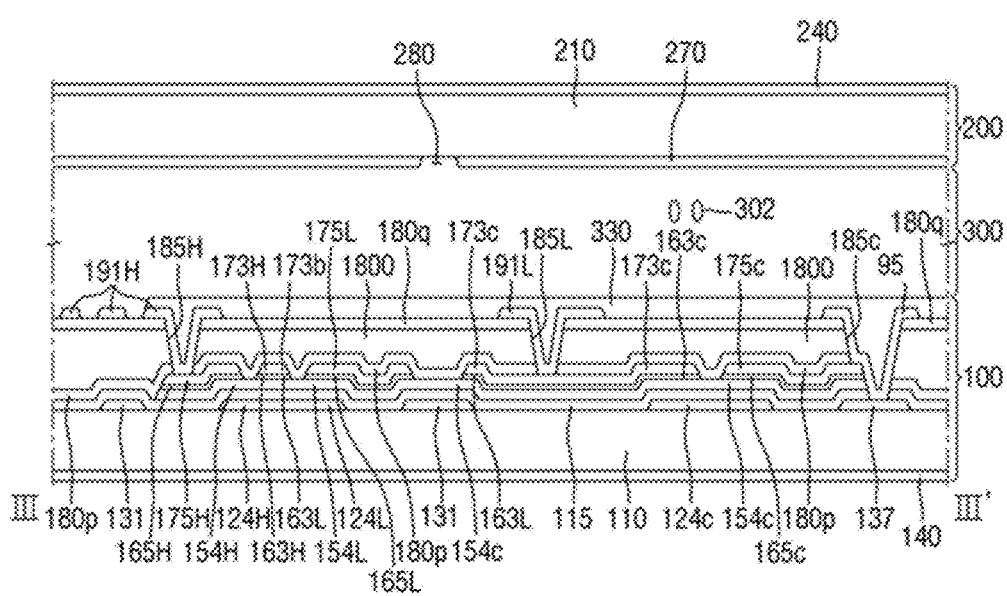
FIG. 24 is a cross-sectional view of the LCD, taken along line of FIG. 22.

FIG. 22 is an equivalent circuit diagram of one pixel PX of an LCD 1 according to an exemplary embodiment of the invention. FIG. 23 is a plan view of one pixel PX of the LCD 1 having the equivalent circuit of FIG. 22. FIG. 24 is a cross-sectional view of the LCD 1, taken along line of FIG. 22. For ease of description, the LCD 1 according to the illustrated exemplary embodiment will hereinafter be described by citing FIGS. 1 through 5.

In FIGS. 22 and 23, one pixel PX and a gate line GL, a data line DL, a voltage dividing reference line RL related to the pixel PX are illustrated. However, a plurality of pixels PX may be arranged in a matrix of rows and columns, and the pixels PX may be disposed near intersections of a plurality of gate lines 121 extending along a row direction and a plurality of data lines 171 extending along a column direction.

Referring to FIGS. 22 to 24, one pixel PX of the LCD 1 according to the illustrated exemplary embodiment may include a first switching device QH, a second switching device QL and a third switching device Qc which may be provided as TFTs and a first liquid crystal capacitor C1 and a second liquid crystal capacitor C2 which may include a dielectric substance and provided by a liquid crystal layer 300.

The first switching device QH and the second switching device QH may have sources (i.e., input terminals) connected to the data line DL and gates (i.e., control terminals) connected to the gate line GL. The third switching device Qc may have a gate (i.e., a control terminal) connected to the gate line GL.

A contact point CP between a drain of the second switching device QL and a source of the third switching device Qc may be connected to a second subpixel electrode 191L of the second liquid crystal capacitor C2, and a drain (i.e., an output terminal) of the first switching device QH may be connected to a first subpixel electrode 191H of the first liquid crystal capacitor C1. The other terminals of the first and second liquid crystal capacitors C1 and C2 may be connected to a common electrode. A drain (i.e., an output terminal) of the third switching device Qc may be connected to a storage electrode line 137. The second subpixel electrode 191b may be electrically connected to the voltage dividing reference line RL by the third switching device Qc.

When a gate-on signal is transmitted to the gate line GL, the first, second and third switching devices QH, QL and Qc connected to the gate line GL may be turned on. A data voltage applied to the data line DL is transferred to the first subpixel electrode 191H via the turned-on first switching device QH. A voltage applied to the second subpixel electrode 191L may be divided by the third switching device Qc connected in series to the second switching device QL. Therefore, the voltage applied to the second subpixel electrode 191L is less than that applied to the first subpixel electrode 191H.

As a result, a voltage charged in the first liquid crystal capacitor C1 may be different from a voltage charged in the second liquid crystal capacitor C2. Since the voltage charged in the first liquid crystal capacitor C1 is different from the voltage charged in the second liquid crystal capacitor C2, liquid crystal molecules may tilt at different angles in a first subpixel PXH and a second subpixel PXL. Accordingly, the two subpixels PXH and PXL may have different luminances.

Therefore, by adjusting the voltage charged in the first liquid crystal capacitor C1 and the voltage charged in the second liquid crystal capacitor C2, an image viewed from the side may be made as close to an image viewed from the front as possible. This may improve lateral visibility of the LCD 1.

In the exemplary embodiment of FIG. 22, the third switching device Qc connected to the second liquid crystal capacitor C2 and the voltage dividing reference line RL is provided in order to make the voltage charged in the first liquid crystal capacitor C1 and the voltage charged in the second liquid crystal capacitor C2 different. However, in an LCD according to another exemplary embodiment of the invention, the second liquid crystal capacitor C2 may be connected to a step-down capacitor.

Specifically, a third switching device including a first terminal connected to a step-down gate line, a second terminal connected to the second liquid crystal capacitor C2 and a third terminal connected to the step-down capacitor may be provided. The third switching device may cause some of the electric charges charged in the second liquid crystal capacitor C2 to be charged in the step-down capacitor, thereby setting the voltages charged in the first liquid crystal capacitor C1 and the second liquid crystal capacitor C2 to different levels. In an LCD according to another exemplary embodiment of the invention, the first liquid crystal capacitor C1 and the second liquid crystal capacitor C2 may be connected to different data lines and thus receive different voltages. Accordingly, the first liquid crystal capacitor C1 and the second liquid crystal capacitor C2 may be charged with different voltages. Using various methods other than those described above, the first liquid crystal capacitor C1 and the second liquid crystal capacitor C2 may be charged with different voltages.

Referring to FIGS. 22 and 24, the LCD 1 may include a first panel 100, a second panel 200, and the liquid crystal layer 300 disposed between the second panel 200 and the first panel 100.

The first panel 100 may include a first substrate 110, the first switching device QH, the second switching device QL, and the third switching device Qc. In addition, the first panel 100 may include a gate line 121, a voltage dividing reference line 131, a data line 171, and a pixel electrode 191 which are electrically connected to the first, second and third switching devices QH, QL and Qc. The pixel electrode 191 includes the first subpixel electrode 191H and the second subpixel electrode 191L.

The voltage dividing reference line 131 may include first storage electrode 135 and 136 and a reference electrode 137. The first storage electrodes 135 and 136 may be connected to the voltage dividing reference line 131, and the voltage dividing reference line 131 may further include second storage electrodes 138 and 139 which are not connected to the voltage dividing reference line 131 but overlap the second subpixel electrode 191L.

The first panel 100 includes a plurality of gate conductors, each having the gate line 121, the voltage dividing reference line 131, and the first and second storage electrodes 135, 136, 138 and 139 disposed on the first substrate 110. In an exemplary embodiment, the first substrate 110 may include glass, such as soda lime glass or borosilicate glass, or plastic.

The gate line 121 and the voltage dividing reference line 131 may extend along a direction, e.g., a horizontal direction and transfer a gate signal. The gate line 121 may include a first gate electrode 124H and a second gate electrode 124L which protrude from the gate line 121 located between the first subpixel electrode 191H and the second subpixel electrode 191L. The gate line 121 may further include a third gate electrode 124c. Here, the first gate electrode 124H and the second gate electrode 124L may be connected to each other, thereby defining one protrusion.

In the illustrated exemplary embodiment, a step-down gate line different from the gate line 121 may also be provided.

The voltage dividing reference line 131 may extend along the horizontal direction and transfer a predetermined voltage such as a common voltage. The voltage dividing reference line 131 may include the first storage electrodes 135 and 136 and may further include the second storage electrodes 138 and 139 extending downward.

Specifically, of the first storage electrodes 135 and 136, the first vertical storage electrode 135 may be provided along vertical edges of the first subpixel electrode 191H disposed in an upper part of a pixel PX. Of the second storage electrodes 138 and 139, the second vertical storage electrode 138 may be provided along vertical edges of the second pixel electrode 191L disposed in a lower part of the pixel PX. The second horizontal storage electrode 139 may be located between a horizontal edge of the second pixel electrode 191L and a horizontal edge of the first pixel electrode 191H, and the first and second horizontal storage electrodes 136 and 139 may be provided along the two horizontal edges.

Consequently, the first vertical storage electrode 135 and the first horizontal storage electrode 136 may be provided along the edges of the first pixel electrode 191H to overlap at least part of the first pixel electrode 191H, and the second vertical storage electrode 138 and the second horizontal storage electrode 139 may be provided along the edges of the second pixel electrode 191L to overlap at least part of the second pixel electrode 191L.

In FIG. 23, the first horizontal storage electrode 136 located in the upper part of the pixel PX and the second horizontal storage electrode 139 located in the lower part of the pixel PX are shown to be separated from each other. However, the two horizontal storage electrodes 136 and 139 are actually electrically connected to their counterparts in vertically adjacent pixels PX, thereby surrounding the first and second subpixel electrodes 191H and 191L in one pixel PX in a ring shape.

The gate line 121, the voltage dividing reference line 131 and the first and second storage electrodes 135, 136, 138 and 139 may include the same material on the same layer. In an exemplary embodiment, the gate line 121, the voltage diving reference line 131 and the first and second storage electrodes 135, 136, 138 and 139 may include aluminum (Al)-based metal such as aluminum and an aluminum alloy, silver (Ag)-based metal such as silver and a silver alloy, copper (Cu)-based metal such as copper and a copper alloy, molybdenum (Mo)-based metal such as molybdenum and a molybdenum alloy, chrome (Cr), titanium (Ti), or tantalum (Ta).

In addition, the gate line 121, the voltage dividing reference line 131 and the first and second storage electrodes 135, 136, 138 and 139 may have a multilayer structure including two conductive layers (not illustrated) with different physical characteristics. In an exemplary embodiment, one of the two conductive layers may include a metal with low resistivity, such as aluminum-based metal, silver-based metal or copper-based metal, in order to reduce a signal delay or a voltage drop of the gate line 121.

A gate insulating layer 115 may be disposed on the whole surface of the first substrate 110 including the gate line 121, the voltage dividing reference line 131 and the first and second storage electrodes 135, 136, 138 and 139. In an exemplary embodiment, the gate insulating layer 115 may include, e.g., silicon oxide (SiOx) or silicon nitride (SiNx).

First, second and third semiconductor layers 154H, 154L and 154c may be disposed on the gate insulating layer 115. At least part of the first, second and third semiconductor layers 154H, 154L and 154c may overlap the first, second and third gate electrodes 124H, 124L and 124c, respectively. Here, the first, second and third semiconductor layers 154H, 154L and 154c may include an oxide semiconductor such as amorphous silicon, polycrystallinen silicon, or zinc oxide (ZnO).

A plurality of ohmic contact members 163H, 165H, 163L, 165L, 163c and 165c may be disposed on the first, second and third semiconductor layers 154H, 154L and 154c. Like the ohmic contact member 163H disposed on the first semiconductor layer 154H, the ohmic contact members 163H, 165H, 163L, 165L, 163c and 165c may be disposed on the corresponding first, second and third semiconductor layers 154H, 154L and 154c.

A plurality of data conductors are disposed on the ohmic contact members 163H, 165H, 163L, 165L, 163c and 165c and the gate insulating layer 115. Each of data conductors includes the data line 171 having a first source electrode 173H and a second source electrode 173L, a first drain electrode 175H, a second drain electrode 175L, a third source electrode 173c and a third drain electrode 175c. The data conductors and the first, second and third semiconductor layers 154H, 154L and 154c and the ohmic contact members 163H, 165H, 163L, 165L, 163c and 165c located under the data conductors may be provided simultaneously using one mask. In addition, the data line 171 includes a wide end (not illustrated) for connection to another layer or an external driver circuit.

A data conductive layer is disposed on the first, second and third semiconductor layers 154H, 154L and 154c. The data conductive layer may include the data line 171 extending in a vertical direction to intersect the gate line 121.

The data line 171 may transfer a data signal and extend along the vertical direction to intersect the gate line 121 and the voltage dividing reference line 131. The data line 171 may include the first source electrode 173H and the second source electrode 173L which extend toward the first gate electrode 124H and the second gate electrode 124L and are connected to each other.

The data conductive layer may include the first source electrode 173H and the second source electrode 173L which are connected to the data line 171, the first drain electrode 175H which faces the first source electrode 173H and is separated from the first source electrode 173H, the second drain electrode 175L which faces the second source electrode 173L and is separated from the second source electrode 173L, the third source electrode 173c which is electrically connected to the second drain electrode 175L, and the third drain electrode 175c which faces the third source electrode 173c and is separated from the third source electrode 173c.

An end of the first drain electrode 175H and an end of the second drain electrode 175L may be partially surrounded by the first source electrode 173H and the second source electrode 173L. A wide end of the second drain electrode 175L may further extend to provide the third source electrode 173c. A wide end 177c of the third drain electrode 175c may overlap the reference electrode 137 to be connected via a third contact hole 185c by a connection electrode 95, and the other end of the third drain electrode 175c having a U-shape may partially surround the third source electrode 173c.

The first, second and third semiconductor layers 154H, 154L and 154c may have substantially the same planar shape as the data conductors 171, 175H, 175L and 175c and the ohmic contact members 163H, 165H, 163L, 165L, 163c and 165c under the data conductors, except for channel regions between the first, second and third source electrodes 173H, 173L and 173c and the first, second and third drain electrodes 175H, 175L and 175c. That is, the first, second and third semiconductor layers 154H, 154L and 154c may include exposed portions not covered by the data conductors 171, 175H, 175L and 175c, such as portions between the first, second and third source electrodes 173H, 173L and 173c and the first, second and third drain electrodes 175H, 175L and 175c.

The data line 171 may directly contact the first, second and third semiconductor layers 154H, 154L and 154c, thereby providing an ohmic contact. The data line 171 may be a single layer including a material with low resistivity in order to serve as an ohmic contact, together with the first, second and third semiconductor layers 154H, 154L and 154c. In an exemplary embodiment, the data line 171 may include Cu, Al, or Ag, for example.

In an exemplary embodiment, to improve ohmic contact characteristics together with the first, second and third semiconductor layers 154H, 154L and 154c, the data line 171 may be provided as a single layer or a multilayer including Ni, Co, Ti, Ag, Cu, Mo, Al, Be, Nb, Au, Fe, Se or Ta. Examples of the multilayer may include a double layer such as Ta/Al, Ta/Al, Ni/Al, Co/Al, Mo(Mo alloy)/Cu, Mo(Mo alloy)/Cu, Ti(Ti alloy)/Cu, TiN(TiN alloy)/Cu, Ta(Ta alloy)/Cu or TiOx/Cu and a triple layer such as Ti/Al/Ti, Ta/Al/Ta, Ti/Al/TiN, Ta/Al/TaN, Ni/Al/Ni or Co/Al/Co.

In an exemplary embodiment, in order to improve an aperture ratio of the first substrate 110 having TFTs, both the gate line 121 and the data line 171 may include a transparent conductive material such as indium tin oxide ("ITO"), indium zinc oxide ("IZO"), or Al-doped zinc oxide ("AZO").

The first, second and third gate electrodes 124H, 124L and 124c, the first, second and third source electrodes 173H, 173L and 173c, and the first, second and third drain electrodes 175H, 175L and 175c may provide first, second and third TFTs QH, QL and Qc together with the first, second and third semiconductor layers 154H, 154L and 154c, respectively. Channels of the TFTs may be provided in the first, second and third semiconductor layers 154H, 154L and 154c between the first, second and third source electrodes 173H, 173L and 173c and the first, second and third drain electrodes 175H, 175L and 175c, respectively.

A passivation layer 180 may be disposed on the data conductors 171, 175H, 175L and 175c and the exposed portions of the first, second and third semiconductor layers 154H, 154L and 154c. The passivation layer 180 may include an inorganic layer or an organic layer. In an alternative exemplary embodiment, the passivation layer 180 may have a double-layer structure including a lower inorganic layer and an upper organic layer in order to protect the first, second and third semiconductor layers 154H, 154L and 154c. In an alternative exemplary embodiment, the passivation layer 180 may have a triple-layer structure including an inorganic layer, an organic layer disposed on the inorganic layer, and another inorganic layer disposed on the organic layer. In an exemplary embodiment, the organic layer used in the passivation layer 180 may be a color filter.

In a specific example, a lower passivation layer 180p may be disposed on the data conductors 171, 175H, 175L and 175c and the exposed portions of the first, second and third semiconductor layers 154H, 154L and 154c. In an exemplary embodiment, the lower passivation layer 180p may include an inorganic insulating material such as silicon nitride or silicon oxide.

An organic layer may be provided as a passivation layer on the lower passivation layer 180p. In an exemplary embodiment, the organic layer may be a color filter 180O. The color filter 180O may extend along the vertical direction between neighboring data lines 171. In an exemplary embodiment, each color filter 180O may display one of three primary colors of red, green and blue. Each color filter 180 may be disposed on the data line 171 to overlap the data line 171.

An upper passivation layer 180q may be disposed on portions of the lower passivation layer 180p exposed by openings defined by the color filter 180O. The upper passivation layer 180q may prevent the lifting of the color filter 180O and suppress the contamination of the liquid crystal layer 300 by organic matter such as a solvent introduced from the color filter 1800, thereby preventing a defect such as an afterimage created during screen driving. The upper passivation layer 180q may include an inorganic insulating material or an organic material such as silicon nitride or silicon oxide.

A first contact hole 185H and a second contact hole 185L which respectively expose an end of the first drain electrode 175H and an end of the second drain electrode 175L may be defined in the lower passivation layer 180p, the color filter 1800 and the upper passivation layer 180q.

The pixel electrode is disposed on the upper passivation layer 180q. The pixel electrode 191 may be connected to the first drain electrode 175H and the second drain electrode 175L by the first contact hole 185H and the second contact hole 185L. In an exemplary embodiment, the pixel electrode 191 may include a transparent conductor such as indium tin oxide ("ITO") or indium zinc oxide ("IZO"). In response to a voltage received through the first drain electrode 175H and the second drain electrode 175L to which a data voltage is applied, the pixel electrode 191 generates an electric field together with a common electrode 270 disposed on the second panel 200, thereby rotating the liquid crystal molecules 302 of the liquid crystal layer 300 disposed between the first panel 100 and the second panel 200.

The pixel electrode 191 may receive a data voltage through a TFT Q controlled by a gate signal.

The pixel electrode 191 may be disposed in each pixel PX defined by the gate line 121 and the data line 171.

The pixel electrode 191 may include the first subpixel electrode 191H and the second subpixel electrode 191L which are separated by the gate line 121 and respectively located in upper and lower parts of a pixel region to neighbor each other in the column direction.

Each of the first subpixel electrode 191H and the second subpixel electrode 191L may include a central electrode 192H or 192L which is located at a center thereof and a micro-branch part 194H or 194L which protrudes from the central electrode 192H or 192L in a diagonal direction. Each of the micro-branch parts 194H and 194L may include a plurality of branch electrodes 194a through 194d.

The pixel electrode 191 may include the central electrodes 192, the micro-branch parts 194H and 194L which extend from sides of the central electrodes 192 in different directions, and peripheral electrodes 193H and 193L which are disposed in an edge region of the pixel PX.

As described above, each of the first subpixel electrode 191H and the second subpixel electrode 191L included in one pixel PX consists of the central electrode 192H or 192L, the micro-branch part 194H or 194L, and the peripheral electrode 193H or 193L. The central electrode 192H or 192L, the micro-branch part 194H or 194L, and the peripheral electrode 193H or 193L of each of the first subpixel electrode 191H and the second subpixel electrode 191L may be integrally connected to each other and thus receive the same voltage. Each of the first subpixel electrode 191H and the second subpixel electrode 191L may be divided into a plurality of domains by horizontal and vertical incision parts 283 and 286.

An opening part 285 may be disposed in a central region located at an intersection of the horizontal and vertical incision parts 283 and 286. The control over liquid crystals may be adjusted by the area of the opening part 285.

The pixel electrode 191 including the first and second subpixel electrodes 191H and 191L may further include the peripheral electrodes 193H and 193L. First slit patterns 195aH and 195aL, second slit patterns 195bH and 195bL, and third slit patterns 195cH and 195cL may be defined in the pixel electrode 191.

In each domain of each of the first subpixel electrode 191H and the second subpixel electrode 191L, the first slit patterns 195aH and 195aL may separate some of the branch electrodes 194a, 194b, 194c or 194d of the micro-branch part 194H or 194L from each other. Ends of the first slit patterns 195aH and 195aL disposed along a lengthwise direction of the branch electrodes 194a, 194b, 194c or 194d may contact the central electrode 192H or 192L, and the other ends of the first slit patterns 195aH and 195aL may contact the peripheral electrode 193H or 193L.

The second slit patterns 195bH and 195bL may separate some of the branch electrodes 194a, 194b, 194c or 194d of the micro-branch part 194H or 194L. Ends of the second slit patterns 195bH and 195bL disposed along the lengthwise direction of the branch electrodes 194a, 194b, 194c or 194d may contact the central electrode 192H or 192L, and the other ends of the second slit patterns 195bH and 195bL may contact a corner pattern 195dH or 195dL.

The third slit patterns 195cH and 195cL may separate some of the branch electrodes 194a, 194b, 194c or 194d of the micro-branch part 194H or 194L. Ends of the third slit patterns 195cH and 195cL disposed along the lengthwise direction of the branch electrodes 194a, 194b, 194c or 194d may contact the central electrode 192H or 192L, and the other ends of the third slit patterns 195cH and 195cL may extend up to the edge region of the pixel PX.

The second panel 200 includes a second substrate 210 which faces the first substrate 110 and the common electrode 270. In an exemplary embodiment, the common electrode 270 may be disposed on the second substrate 210 including transparent glass or plastic, for example.

In an exemplary embodiment, a light-blocking member 330 and the color filter 1800 may be optionally disposed on the second panel 200. A light-blocking member, a color filter, an overcoat layer, and a second alignment layer may be optionally disposed on the second substrate 210. In the illustrated exemplary embodiment, a case where the color filter 1800 and the light-blocking member 330 are disposed on the first panel 100 has been described above.

The color filter 1800 and the light-blocking member 330 placed on the first substrate 110 may prevent a problem such as the misalignment of wirings in a curved display device and, when determining an alignment direction together with the second alignment layer, may prevent problems of a disclination line that causes the misalignment of liquid crystals.

In a case where the light-blocking member, the color filter, the overcoat layer and the second alignment layer are disposed on the second substrate 210, a plurality of color filters of multiple colors may be disposed on the second substrate 210, and the light-blocking member may be disposed at a boundary between the color filters. The color filters may filter light of certain wavelengths, and the light-blocking member, also referred to as a black matrix, may prevent the leakage of light and color mixing of the color filters.

In addition, the overcoat layer and the second alignment layer may be optionally disposed on the second panel 200. The overcoat layer may be disposed on the whole surface of the second substrate 210 having the color filters and the light-blocking member. In an exemplary embodiment, the overcoat layer may include an insulating material and provide a flat surface. In another exemplary embodiment, the overcoat layer may be omitted.

The common electrode 270 may be disposed on the overcoat layer. In an exemplary embodiment, the second alignment layer may be disposed on the common electrode 270 and may be a vertical alignment layer. In another exemplary embodiment, the second alignment layer may be omitted.

An incision part 280 including the first incision part 283 and the second incision part 286 may be defined in the common electrode 270. The first incision part 283 may partially cut the common electrode 270 in the horizontal direction, and the second incision part 286 may partially cut the common electrode 270 in the vertical direction. The first incision part 283 and the second incision part 286 may provide a cross shape when seen in a plan view. Edges of the first and second incision parts 283 and 286 may protrude further than those of the first and second subpixel electrodes 191H and 191L. Since edges of the incision part 280 of the common electrode 270 protrude further than those of the pixel electrode 191, the effect of a horizontal electric field may stably reach up to edges of the pixel PX. Therefore, the arrangement of the liquid crystal molecules 302 may be adjusted toward a desired direction even on the edges of the pixel PX.

A width of each of the first and second incision parts 283 and 286 may be approximately three times or less a thickness of the liquid crystal layer 300, that is, a cell gap. In an exemplary embodiment, each of the first and second incision parts 283 and 286 may have a width of approximately 2 µm to approximately 5 µm, for example. In addition, the opening part 285 may be disposed at an intersection of the first incision part 283 and the second incision part 286.

As described above, the first subpixel electrode 191H and the second subpixel electrode 191L may be connected to the first drain electrode 175H and the second drain electrode 175L by the first contact hole 185H and the second contact hole 185L and receive data voltages from the first drain electrode 175H and the second drain electrode 175L, respectively.

Sides of the branch electrodes 194a through 194d may define horizontal components that determine tilt directions of the liquid crystal molecules 302 by distorting electric fields. The horizontal components of the electric fields may move the liquid crystal molecules 302 such that the liquid crystal molecules 302 are arranged in directions parallel to the lengthwise directions of the branch electrodes 194a through 194d. Therefore, as described above with reference to FIGS. 1 through 5, the liquid crystal molecules 302 may tilt in directions parallel to the lengthwise directions of the branch electrodes 194a through 194d. Since one pixel electrode 191 includes four domains Da through Dd in which the lengthwise directions of the branch electrodes 194a through 194d are different, the liquid crystal molecules 302 may tilt in approximately four directions, and the four domains Da through Dd in which the liquid crystal molecules 302 are aligned in different directions may be provided in one subpixel.

In addition, the liquid crystal molecules 302 irregularly arranged on edges of each domain may be rearranged in a direction similar to an average azimuthal angle 310 by the second slit patterns 195bL or 195bH.

As described above, when the liquid crystal molecules 302 are made to tilt in various directions using a plurality of domains Da through Dd and when the peripheral electrode 193H or 193L is placed in each domain, more liquid crystal molecules 302 may be arranged at the average azimuthal angle 310. Accordingly, this may improve transmittance and response speed of the LCD 1.

According to exemplary embodiments of the invention, slit patterns that define the shapes of electrodes and separate the electrodes are provided in a pixel, thereby improving visibility and transmittance.

However, the effects of the invention are not restricted to the one set forth herein. The above and other effects of the invention will become more apparent to one of daily skill in the art to which the invention pertains by referencing the claims.

Although certain exemplary embodiments and implementations have been described herein, other exemplary embodiments and modifications will be apparent from this description. Accordingly, the invention is not limited to such exemplary embodiments, but rather to the broader scope of the presented claims and various obvious modifications and equivalent arrangements.

What is claimed is:

1. A liquid crystal display comprising:
    a first panel comprising:
        a first electrode which comprises a central electrode disposed in a central region of a pixel;
        a micro-branch part defined by a plurality of branch electrodes each extending in a direction from at least one side of the central electrode;
        a peripheral electrode connected to an end of a part of at least one first branch electrode of the plurality of branch electrodes, and
        a corner pattern defined in a corner region of the pixel by removing an end of at least one second branch electrode different from the at least one first branch electrode, and
    first slit patterns, second slit patterns and third slit patterns which separate branch electrodes of the plurality of branch electrodes of the micro-branch part;
    a second panel in which horizontal and vertical incision parts which divide the micro-branch part, the central electrode and the peripheral electrode of the first electrode into a plurality of domains are defined, and which comprises a second electrode which is divided by the horizontal and vertical incision parts corresponding to the plurality of domains; and
    a liquid crystal layer disposed between the first panel and the second panel and including liquid crystals,
    wherein in the first panel, the peripheral electrode located adjacent to the corner pattern is disposed on at least one of an edge region of the pixel in a direction parallel to the horizontal or vertical incision part,
    wherein ends of the third slit patterns disposed along the lengthwise direction of the plurality of branch electrodes contact the central electrode, and the other ends of the third slit patterns extend up to the edge region of the pixel,
    wherein the third slit patterns are disposed between the corner pattern and the peripheral electrode.

2. The liquid crystal display of claim 1, wherein the first panel further comprises:
    wherein ends of the first slit patterns disposed along a lengthwise direction of the plurality of branch electrodes contact the central electrode, and the other ends of the first slit patterns contact the peripheral electrode, and ends of the second slit patterns disposed along the lengthwise direction of the plurality of branch electrodes contact the central electrode, and the other ends of the second slit patterns are connected to the corner pattern.

3. The liquid crystal display of claim 2, wherein the micro-branch part of the first panel is disposed in each of the plurality of domains, the micro-branch part comprises the branch electrodes, and the first and second slit patterns are defined by removing spaces between neighboring branch electrodes of the plurality of branch electrodes and separating the plurality of branch electrodes from each other.

4. The liquid crystal display of claim 3, wherein the first and third slit patterns of the first panel are alternately arranged.

5. The liquid crystal display of claim 2, wherein the plurality of branch electrodes and the first slit patterns in each of the plurality of domains are alternately arranged with those in an adjacent domain of the plurality of domains.

6. The liquid crystal display of claim 1, wherein an area of the corner pattern in the corner region of the pixel is asymmetrical to that of a corner pattern in another corner region of the pixel.

7. The liquid crystal display of claim 1, wherein the peripheral electrode is disposed on at least one of left, right, upper and lower sides of the edge region of the pixel and in at least one of the plurality of domains.

8. The liquid crystal display of claim 1, wherein the central electrode has at least one of a polygonal shape including a diamond, a quadrilateral and an octagon, a circular shape, and a stem shape in which stems are intersecting each other.

9. The liquid crystal display of claim 1, wherein the micro-branch part extending from the at least one side of the central electrode to the corner region of the pixel has a length of approximately 30 micrometers or less.

10. The liquid crystal display of claim 1, wherein the horizontal incision part of the second electrode divides the central electrode into upper and lower domains of the plurality of domains and the vertical incision part of the second electrode which intersects the horizontal incision part divides the central electrode into left and right domains of the plurality of domains, wherein an opening part of the second electrode is disposed at an intersection of the horizontal incision part and the vertical incision part.

11. The liquid crystal display of claim 10, wherein the opening part has a width of approximately 2 to approximately 12 micrometers.

12. The liquid crystal display of claim 1, wherein the first electrode further comprises a connection electrode which is disposed between the central electrode and the peripheral electrode and in a region corresponding to each of the horizontal and vertical incision parts.

13. The liquid crystal display of claim 1, wherein the first electrode disposed in the pixel comprises:
    a first region in which the micro-branch part located adjacent to the central electrode is disposed; and
    a second region which is separated from the central electrode and in which at least one peripheral electrode is disposed at an end of at least one branch electrode of the micro-branch part,
    wherein the peripheral electrode disposed in the second region provides a vector which rotates liquid crystal molecules located in the second region in a direction similar to an average azimuthal angle of liquid crystal molecules located in the first region.

14. The liquid crystal display of claim 13, wherein a direction in which the plurality of branch electrodes extend is the same as the average azimuthal angle.

15. The liquid crystal display of claim 2, further comprising first and second polarizing plates which are respectively disposed on the first and second panels and have polarization axes orthogonal to each other, wherein the direction in which the plurality of branch electrodes extend is at an angle of approximately 30 degrees to approximately 60 degrees with respect to the polarization axes of the first and second polarizing plates.

16. The liquid crystal display of claim 1, wherein the peripheral electrode has a width of approximately 1 micrometer to approximately 5 micrometers.

17. The liquid crystal display of claim 3, wherein the plurality of branch electrodes and the first through third slit patterns are arranged at a pitch of approximately 4 micrometers to approximately 8 micrometers.

18. The liquid crystal display of claim 2, wherein the second slit patterns in each pixel are alternately arranged with those in another pixel.

19. The liquid crystal display of claim 2, wherein the plurality of branch electrodes and the first slit patterns have equal widths.

* * * * *